US012526406B2

United States Patent
Lainema et al.

(10) Patent No.: US 12,526,406 B2
(45) Date of Patent: Jan. 13, 2026

(54) APPARATUS AND METHOD FOR BLENDING EXTRA OUTPUT PIXELS OF A FILTER AND DECODER-SIDE SELECTION OF FILTERING MODES

(71) Applicant: Nokia Technologies Oy, Espoo (FI)

(72) Inventors: Jani Lainema, Tampere (FI); Francesco Cricrì, Tampere (FI); Ramin Ghaznavi Youvalari, Tampere (FI); Miska Matias Hannuksela, Tampere (FI); Honglei Zhang, Tampere (FI); Maria Claudia Santamaria Gomez, Tampere (FI); Ruiying Yang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 18/470,973

(22) Filed: Sep. 20, 2023

(65) Prior Publication Data
US 2024/0121387 A1    Apr. 11, 2024

Related U.S. Application Data

(60) Provisional application No. 63/378,450, filed on Oct. 5, 2022.

(51) Int. Cl.
*H04N 19/117*    (2014.01)
*H04N 19/103*    (2014.01)
(Continued)

(52) U.S. Cl.
CPC ......... *H04N 19/117* (2014.11); *H04N 19/103* (2014.11); *H04N 19/136* (2014.11);
(Continued)

(58) Field of Classification Search
None
See application file for complete search history.

(56) References Cited

U.S. PATENT DOCUMENTS

2019/0289327 A1* 9/2019 Lin .................... G06N 3/045
2022/0345752 A1* 10/2022 Jiang ................. H04N 19/117

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Rebecca A Volentine
(74) *Attorney, Agent, or Firm* — Nokia Technologies Oy

(57) ABSTRACT

An example method includes: receiving an input extended block comprising an input block and input margins, wherein the input block is derived from an image or a video frame, and wherein the input block and the input margins are input to a filter, and wherein the input margins comprise pixels of the image or the video frame; filtering the input extended block to obtain a filtered extended block comprising a filtered block and filtered margins; receiving other blocks, wherein the other blocks are derived from the image or video frame, and wherein at least one pixel of the other blocks overlaps with at least one pixel of the filtered margins of the filtered extended block; and blending the filtered extended block with the other blocks, wherein an operation to blend the filtered extended block with the other blocks is applied to two or more overlapping pixels.

20 Claims, 18 Drawing Sheets

(51) Int. Cl.
    *H04N 19/136*      (2014.01)
    *H04N 19/157*      (2014.01)
    *H04N 19/172*      (2014.01)
    *H04N 19/176*      (2014.01)
    *H04N 19/182*      (2014.01)
    *H04N 19/42*      (2014.01)
    *H04N 19/80*      (2014.01)

(52) U.S. Cl.
    CPC ......... *H04N 19/157* (2014.11); *H04N 19/172* (2014.11); *H04N 19/176* (2014.11); *H04N 19/182* (2014.11); *H04N 19/42* (2014.11); *H04N 19/80* (2014.11)

(56) References Cited

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Oct. 3, 2023, Webpage available at : https://en.wikipedia.org/wiki/IEEE_802.11.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 15: Advanced Video Coding (AVC) File Format", ISO/IEC 14496-15, First edition, Apr. 15, 2004, 29 pages.

\* cited by examiner

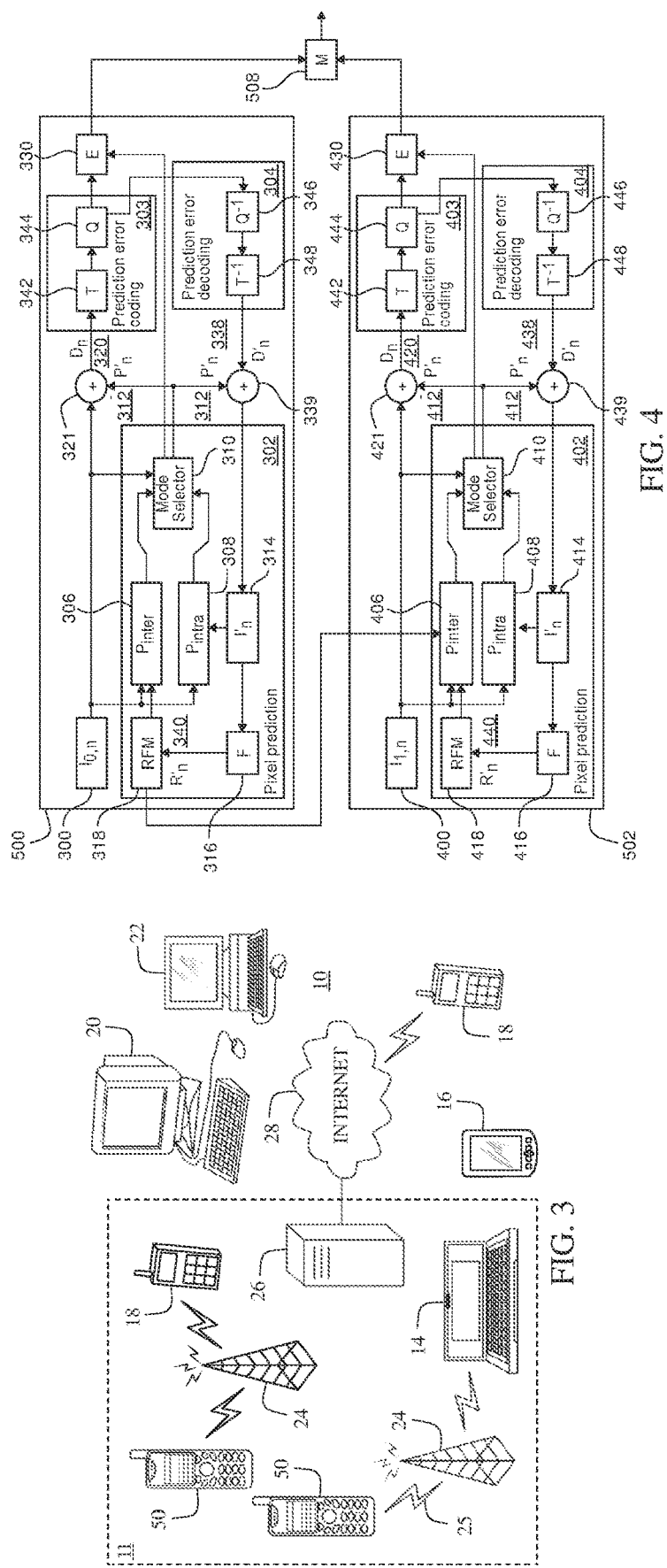

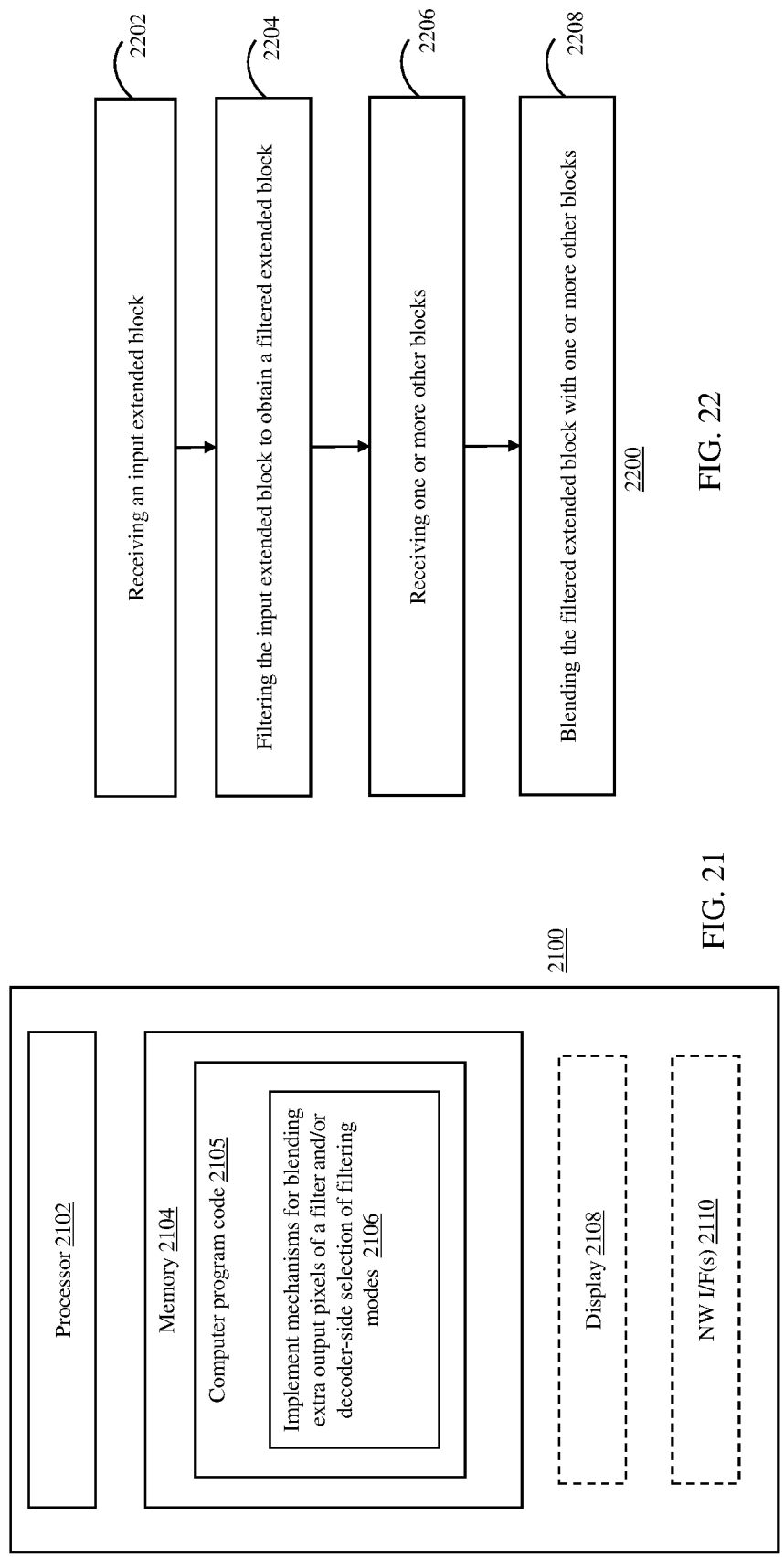

APPARATUS AND METHOD FOR BLENDING EXTRA OUTPUT PIXELS OF A FILTER AND DECODER-SIDE SELECTION OF FILTERING MODES

SUPPORT STATEMENT

The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey.

TECHNICAL FIELD

The examples and non-limiting embodiments relate generally to multimedia transport and neural networks, and more particularly, to method, apparatus, and computer program product for blending extra output pixels of a filter and/or decoder-side selection of filtering modes.

BACKGROUND

It is known to provide standardized formats for exchange of neural networks.

SUMMARY

An example apparatus includes: at least one processor; and at least one memory storing instructions that, when executed by the at least one processor, cause the apparatus at least to: receive an input extended block, wherein the input extended block comprises an input block and one or more input margins, and wherein the input block is derived from an image or a video frame, and wherein the input block and the one or more input margins are input to a filter, and wherein the one or more input margins comprise one or more pixels of the image or the video frame; filter the input extended block to obtain a filtered extended block, wherein the filtered extended block comprises a filtered block and one or more filtered margins; receive one or more other blocks, wherein the one or more other blocks are derived from the image or video frame, and wherein at least one pixel of the one or more other blocks overlaps with at least one pixel of the filtered margins of the filtered extended block; and blend the filtered extended block with the one or more other blocks, wherein an operation to blend the filtered extended block with the one or more other blocks is applied to two or more overlapping pixels, and wherein a pixel is considered to overlap with another pixel when a position of the pixel and the another pixel, within the image or the video frame, is same or substantially same.

The example apparatus may further include, wherein: the input extended block comprises a first extended block and the one or more other blocks comprise a second block, and wherein at least one pixel of the of the first extended block overlaps with at least one pixel of the second block; the filtered extended block comprises a filtered block and one or more filtered margins; and wherein the two or more overlapping pixels comprise a first set of pixels comprised in a filtered margin of the one or more filtered margins and a second set of pixels comprised in the second block.

The example apparatus may further include, wherein: the input extended block comprises a first extended block and the one or more other blocks comprise a second extended block, and wherein at least one pixel of the first extended block overlaps with at least one pixel of the second extended block; the first extended block is filtered by using a first filter to obtain a first filtered extended block, wherein the first filtered extended block comprises a first filtered block and first one or more filtered margins; the apparatus is further caused to filter, by using a second filter, the second extended block to obtain a second filtered extended block, wherein the second filtered extended block comprises a second filtered block and second one or more filtered margins; and the two or more overlapping pixels comprise: a first set of pixels comprised in the first filtered block and a second set of pixels comprised in a filtered margin of the second one or more filtered margins; or a first set of pixels comprised in a filtered margin of the first one or more filtered margins and the second set of pixels comprised in the second filtered block. In an embodiment, the first filter and the second filter may be the same filter. In another embodiment, the first filter and the second filter may be different filters.

The example apparatus may further include, wherein the two or more overlapping pixels are blended by a weighted sum based at least on two or more weights.

The example apparatus may further include, wherein: the input extended block comprises a first extended block and the other one or more blocks comprise a second extended block, and a third extended block, and wherein at least one pixel of the of the first extended block overlaps with at least one pixel of the second extended block, and the at least one pixel of the second extended block overlaps with at least one pixel of the third extended block; the first extended block is filtered by using a first filter to obtain a first filtered extended block, wherein the first filtered extended block comprises a first filtered block and first one or more filtered margins; the apparatus is further caused to filter, by using a second filter, the second extended block to obtain a second filtered extended block, wherein the second filtered extended block comprises a second filtered block and second one or more filtered margins; the apparatus is further caused to filter, by using a third filter, the third extended block to obtain a third filtered extended block, wherein the third filtered extend block comprises a third filtered block and third one or more filtered margins; and the two or more overlapping pixels comprise: at least two of a first set of pixels comprised in a filtered margin of the one or more first filtered margins, a second set of pixels comprised in the second filtered block, or a third set of pixels comprised in the third filtered block; at least two of a first set of pixels comprised in the first filtered block, a second set of pixels comprised in a filtered margin of the second one or more filtered margins, a third set of pixels comprised in a filtered margin of the third one or more filtered margins; or at least two of the first set of pixels comprised in the first filtered margin of the first one or more filtered margins, a second set of pixels comprised in a filtered margin of the second one or more filtered margins, or a third set of pixels comprised in a filtered margin of the third one or more filtered margins.

The example apparatus may further include, wherein the two or more overlapping pixels are blended by a weighted sum based on two or more weights.

The example apparatus may further include, wherein: the two or more weights are predetermined; the two or more weights are predetermined and change linearly based at least on a position of pixels they are associated with; the two or more weights are predetermined and are fixed or do not change according to the position of the pixels they are associated with; or the two or more weights are predetermined and at least one of the predetermined weight is determined based at least on a performance of the filter.

The example apparatus may further include, wherein the apparatus is further caused to determine the two or more weights, and wherein the determined two or more weights, or indications of the determined two or more weights are signaled from an encoder to a decoder.

The example apparatus may further include, wherein the apparatus is further caused to determine the two or more weights based on an optimization process, and wherein the two or more overlapping pixels are comprised in one of the following: an overlapping region; two of more overlapping regions; all overlapping regions in the image or the video frame; or two or more frames of the video.

The example apparatus may further include, wherein the apparatus is further caused to determine the two or more weights based on one or more of the following: data of the input block; data of the input extended block; data of a margin of the one or more input margins; data of the filtered block; data of the filtered extended block; data of a filtered margin comprised in the filtered extended block; or one or more estimate of uncertainty or confidence of the filter with respect to data of at least the filtered block or the one or more filtered margins.

The example apparatus may further include, wherein the one or more uncertainty or confidence estimate is comprised in an output of the filter, wherein the one or more uncertainty or confidence estimate represents an estimate of performance of the filter for the filtered extended block or a part of the filtered extended block.

The example apparatus may further include, wherein the filter is trained based at least on a loss, wherein the loss is a distortion function computed based on the one or more estimated uncertainty or confidence and an error made by the filter.

The example apparatus may further include, wherein the apparatus is further caused to: determine an optimal mode, to weight the two or more overlapping pixels, from two or more candidate modes; and signal the optimal mode or indication of the optimal mode from the encoder to the decoder.

The example apparatus may further include, wherein the apparatus is caused to determine the optimal mode based at least on one of the following: a first set of predetermined weights, wherein the first set of predetermined weights linearly change according to a position of pixels to which they are applied; a second set of predetermined weights, wherein the second set of predetermined weights linearly change according to a position of pixels to which they are applied; the first set of predetermined weights, wherein the first set of predetermined weights do no change according to the position of the pixels to which they are applied; the second set of predetermined weights, wherein the second set of predetermined weights do not change according to the position of the pixels to which they are applied; a set of weights, wherein the set of weights or indications about the set of weights are be signaled from an encoder to the decoder; or a set of content-adaptive weights.

The example apparatus may further include, wherein the apparatus is further caused to train or finetune the filter based on an output of a first filter and a second filter, wherein at a training or finetuning iteration, the apparatus is further caused to: filter an input, to the filter, to obtain a first output block, wherein the input comprises a first input block or a first extended input block; combine the first output block with an auxiliary output, wherein the auxiliary output comprises one or more pixels of a second output block, and wherein the second output block is output by the first filter or by the second filter when the input to the first filter or to the second filter is a second input block or a second extended input block, and wherein the combination represents a final output of the filter, and is used to compute a value of a loss function based at least on ground-truth information; differentiate the value of the loss function with respect to at least one of one or more parameters of the filter or one or more parameters of the combination to obtain one or more gradients; and use the one or more gradients update the one or more parameters of at least one of the filter or the one or more parameters of the combination.

Another example apparatus includes: at least one processor; and at least one memory storing instructions that, when executed by the at least one processor, cause the apparatus at least to: lower quality of an input data unit to obtain a low quality input data unit; filter the low quality input data unit based at least on two or more filtering modes to obtain two or more filtered data units, wherein the two or more filtering modes are associated with one or more filters; compute two or more accuracies based at least on the two or more filtered data units and the input data unit; determine an optimal filtering mode to be a filtering mode that provides an accuracy that is greater than or equal a threshold accuracy; and use the filter and configuration of the filter that are associated with the optimal filtering mode to filter the input data unit.

The example apparatus may further include, wherein the threshold accuracy comprises a highest accuracy.

The apparatus of any of the previous claims, wherein the two or more filtering modes are associated with two versions of one or more filters, and wherein a first version comprises a pretrained filter mode, and the second version comprises an overfitted filter mode.

Yet another example apparatus includes: at least one processor; and at least one memory storing instructions that, when executed by the at least one processor, cause the apparatus at least to: derive input block from a decoded picture or a video frame; lower the quality of the input block; provide low quality block as an input to two versions of a neural network (NN) filter to obtain respective two filtered blocks, wherein the two versions are associated with two respective filtering modes, and wherein a first version of the two versions is a pretrained NN filter and a second version of the two versions is an overfitted NN filter; compute two peak signal-to-noise ratio (PSNR) values are based on the input block and the respective two filtered blocks; determine an optimal filtering mode to be a filtering mode associated with the version of NN filter that provides a filtered block of the two respective filtered blocks with higher PSNR.

The example apparatus may further include, wherein to lower the quality of the input block or unit, the apparatus is caused to perform following one or more methods: quantization and de-quantization of the input block or unit based on one or more quantization parameters that predetermined or received from an encoder; transform, quantization, de-quantization, and inverse transform of the input block or unit; re-encoding and re-decoding of the input block or unit; down-sampling and up-sampling of the input block or unit; or adding noise or artefacts to the input block or unit.

The example apparatus may further include, wherein the apparatus is further caused to signal information about or an identifier of selected one or more methods of the one or more methods to be used to lower the quality of the input block or unit from the encoder.

The example apparatus may further include, wherein the apparatus is further caused to signal information about one or more parameters related to selected one or more methods of the one or more methods to be used to lower the quality of the input block or a unit from the encoder.

The example apparatus may further include, wherein apparatus is further caused to signal a scope of the selected one more method, wherein the scope indicates whether the selected one or more method is used for all data units in a video, for a certain frame in the video, for one or more blocks of a frame in the video, or for a random access segment of the video.

The example apparatus may further include, wherein the apparatus is further caused to signal information about or an identifier of the optimal filtering mode.

The example apparatus may further include, wherein the apparatus is further caused to compress the identifier.

The example apparatus may further include, wherein the apparatus is further caused to copy an optimal filtering mode for another data unit from the optimal filtering mode for the input data unit.

The example apparatus may further include, wherein the apparatus is further caused to: determine one or more weights associated with the two or more filtering modes; use the one or more weights to weight an output of the one or more filters associated to the one or more filtering modes; and combine the weighted outputs, wherein an output of the combination represents the filtered output.

The example apparatus may further include, wherein the input block comprises a reconstructed base layer (BL) block, and wherein the apparatus is further caused to: filter the reconstructed BL block with multiple NN filters; perform a pre-processing operation on at least one of the filtered BL outputs or the respective reconstructed enhancement blocks, when at least one of a spatial resolution or other dimension of the filtered BL outputs are not equal to those of the respective reconstructed enhancement layer blocks; and compute an accuracy of each filtered BL output against respective reconstructed enhancement layer block, wherein the optimal filtering mode comprises a filtering mode associated to the NN filter that produced a BL output with a threshold accuracy.

An example method includes: receiving an input extended block, wherein the input extended block comprises an input block and one or more input margins, and wherein the input block is derived from an image or a video frame, and wherein the input block and the one or more input margins are input to a filter, and wherein the one or more input margins comprise one or more pixels of the image or the video frame; filtering the input extended block to obtain a filtered extended block, wherein the filtered extended block comprises a filtered block and one or more filtered margins; receiving one or more other blocks, wherein the one or more other blocks are derived from the image or video frame, and wherein at least one pixel of the one or more other blocks overlaps with at least one pixel of the filtered margins of the filtered extended block; and blending the filtered extended block with the one or more other blocks, wherein an operation to blend the filtered extended block with the one or more other blocks is applied to two or more overlapping pixels, and wherein a pixel is considered to overlap with another pixel when a position of the pixel and the another pixel, within the image or the video frame, is same or substantially same.

The example method may further include, wherein: the input extended block comprises a first extended block and the one or more other blocks comprise a second block, and wherein at least one pixel of the of the first extended block overlaps with at least one pixel of the second block; the filtered extended block comprises a filtered block and one or more filtered margins; and wherein the two or more overlapping pixels comprise a first set of pixels comprised in a filtered margin of the one or more filtered margins and a second set of pixels comprised in the second block.

The example method may further include, wherein: the input extended block comprises a first extended block and the one or more other blocks comprise a second extended block, and wherein at least one pixel of the first extended block overlaps with at least one pixel of the second extended block; the first extended block is filtered by using a first filter to obtain a first filtered extended block, wherein the first filtered extended block comprises a first filtered block and first one or more filtered margins; the method further comprises filtering, by using a second filter, the second extended block to obtain a second filtered extended block, wherein the second filtered extended block comprises a second filtered block and second one or more filtered margins; and the two or more overlapping pixels comprise: a first set of pixels comprised in the first filtered block and a second set of pixels comprised in a filtered margin of the second one or more filtered margins; or a first set of pixels comprised in a filtered margin of the first one or more filtered margins and the second set of pixels comprised in the second filtered block. In an embodiment, the first filter and the second filter may be the same filter. In another embodiment, the first filter and the second filter may be different filters.

The example apparatus may further include, wherein the two or more overlapping pixels are blended by a weighted sum based at least on two or more weights.

The example method may further include, wherein: the input extended block comprises a first extended block and the other one or more blocks comprise a second extended block, and a third extended block, and wherein at least one pixel of the of the first extended block overlaps with at least one pixel of the second extended block, and the at least one pixel of the second extended block overlaps with at least one pixel of the third extended block; the first extended block is filtered by using a first filter to obtain a first filtered extended block, wherein the first filtered extended block comprises a first filtered block and first one or more filtered margins; the method further comprises filtering, by using a second filter, the second extended block to obtain a second filtered extended block, wherein the second filtered extended block comprises a second filtered block and second one or more filtered margins; the method further comprises filtering, by using a third filter, the third extended block to obtain a third filtered extended block, wherein the third filtered extend block comprises a third filtered block and third one or more filtered margins; and the two or more overlapping pixels comprise: at least two of a first set of pixels comprised in a filtered margin of the one or more first filtered margins, a second set of pixels comprised in the second filtered block, or a third set of pixels comprised in the third filtered block; at least two of a first set of pixels comprised in the first filtered block, a second set of pixels comprised in a filtered margin of the second one or more filtered margins, a third set of pixels comprised in a filtered margin of the third one or more filtered margins; or at least two of the first set of pixels comprised in the first filtered margin of the first one or more filtered margins, a second set of pixels comprised in a filtered margin of the second one or more filtered margins, or a third set of pixels comprised in a filtered margin of the third one or more filtered margins.

The example method may further include, wherein the two or more overlapping pixels are blended by a weighted sum based on two or more weights.

The example method may further include, wherein: the two or more weights are predetermined; the two or more weights are predetermined and change linearly based at least on a position of pixels they are associated with; the two or more weights are predetermined and are fixed or do not change according to the position of the pixels they are associated with; or the two or more weights are predetermined and at least one of the predetermined weight is determined based at least on a performance of the filter.

The example method may further include determining the two or more weights, and wherein the determined two or more weights, or indications of the determined two or more weights are signaled from an encoder to a decoder.

The example method may further include determining the two or more weights based on an optimization process, and wherein the two or more overlapping pixels are comprised in one of the following: an overlapping region; two of more overlapping regions; all overlapping regions in the image or the video frame; or two or more frames of the video.

The example method may further include determining the two or more weights based on one or more of the following: data of the input block; data of the input extended block; data of a margin of the one or more input margins; data of the filtered block; data of the filtered extended block; data of a filtered margin comprised in the filtered extended block; or one or more estimate of uncertainty or confidence of the filter with respect to data of at least the filtered block or the one or more filtered margins.

The example method may further include, wherein the one or more uncertainty or confidence estimate is comprised in an output of the filter, wherein the one or more uncertainty or confidence estimate represents an estimate of performance of the filter for the filtered extended block or a part of the filtered extended block.

The example method may further include, wherein the filter is trained based at least on a loss, wherein the loss is a distortion function computed based on the one or more estimated uncertainty or confidence and an error made by the filter.

The example method may further include: determining an optimal mode, to weight the two or more overlapping pixels, from two or more candidate modes; and signaling the optimal mode or indication of the optimal mode from the encoder to the decoder.

The example method may further include determining the optimal mode based at least on one of the following: a first set of predetermined weights, wherein the first set of predetermined weights linearly change according to a position of pixels to which they are applied; a second set of predetermined weights, wherein the second set of predetermined weights linearly change according to the position of the pixels to which they are applied; the first set of predetermined weights, wherein the first set of predetermined weights do no change according to a position of pixels to which they are applied; the second set of predetermined weights, wherein the second set of predetermined weights do no change according to the position of the pixels to which they are applied; a set of weights, wherein the set of weights or indications about the set of weights are be signaled from an encoder to the decoder; or a set of content-adaptive weights.

The example method may further include training or finetuning the filter based on an output of a first filter and a second filter, wherein at a training or finetuning iteration, the method further comprises: filtering an input, to the filter, to obtain a first output block, wherein the input comprises a first input block or a first extended input block; combining the first output block with an auxiliary output, wherein the auxiliary output comprises one or more pixels of a second output block, and wherein the second output block is output by the first filter or by the second filter when the input to the first filter or to the second filter is a second input block or a second extended input block, and wherein the combination represents a final output of the filter, and is used to compute a value of a loss function based at least on ground-truth information; differentiating the value of the loss function with respect to at least one of one or more parameters of the filter or one or more parameters of the combination to obtain one or more gradients; and using the one or more gradients update the one or more parameters of at least one of the filter or the one or more parameters of the combination.

Another example method includes: lowering quality of an input data unit to obtain a low quality input data unit; filtering the low quality input data unit based at least on two or more filtering modes to obtain two or more filtered data units, wherein the two or more filtering modes are associated with one or more filters; computing two or more accuracies based at least on the two or more filtered data units and the input data unit; and determining an optimal filtering mode to be a filtering mode that provides an accuracy that is greater than or equal a threshold accuracy; and using the filter and configuration of the filter that are associated with the optimal filtering mode to filter the input data unit.

The example method may further include, wherein the threshold accuracy comprises a highest accuracy.

The example method may further include, wherein the two or more filtering modes are associated with two versions of one or more filters, and wherein a first version comprises a pretrained filter mode, and the second version comprises an overfitted filter mode.

Yet another example method includes: deriving input block from a decoded picture or a video frame; lowering the quality of the input block; providing low quality block as an input to two versions of a neural network (NN) filter to obtain respective two filtered blocks, wherein the two versions are associated with two respective filtering modes, and wherein a first version of the two versions is a pretrained NN filter and a second version of the two versions is an overfitted NN filter; computing two peak signal-to-noise ratio (PSNR) values are based on the input block and the respective two filtered blocks; determining an optimal filtering mode to be a filtering mode associated with the version of NN filter that provides a filtered block of the two respective filtered blocks with higher PSNR.

The example method may further include, wherein lowering the quality of the input block or unit, includes performing following one or more methods: quantization and de-quantization of the input block or unit based on one or more quantization parameters that predetermined or received from an encoder; transform, quantization, de-quantization, and inverse transform of the input block or unit; re-encoding and re-decoding of the input block or unit; down-sampling and up-sampling of the input block or unit; or adding noise or artefacts to the input block or unit.

The example method may further include signaling information about or an identifier of selected one or more methods of the one or more methods to be used to lower the quality of the input block or unit from the encoder.

The example method may further include signaling information about one or more parameters related to selected one or more methods of the one or more methods to be used to lower the quality of the input block or a unit from the encoder.

The example method may further include signaling a scope of the selected one more method, wherein the scope indicates whether the selected one or more method is used for all data units in a video, for a certain frame in the video, for one or more blocks of a frame in the video, or for a random access segment of the video.

The example method may further include signaling information about or an identifier of the optimal filtering mode.

The example method may further include compressing the identifier.

The example method may further include copying an optimal filtering mode for another data unit from the optimal filtering mode for the input data unit.

The example method may further include: determining one or more weights associated with the two or more filtering modes; using the one or more weights to weight an output of the one or more filters associated to the one or more filtering modes; and combining the weighted outputs, wherein an output of the combination represents the filtered output.

The example method may further include, wherein the input block comprises a reconstructed base layer (BL) block, and wherein the method further comprises: filtering the reconstructed BL block with multiple NN filters; performing a pre-processing operation on at least one of the filtered BL outputs or the respective reconstructed enhancement blocks, when at least one of a spatial resolution or other dimension of the filtered BL outputs are not equal to those of the respective reconstructed enhancement layer blocks; and computing an accuracy of each filtered BL output against respective reconstructed enhancement layer block, wherein the optimal filtering mode comprises a filtering mode associated to the NN filter that produced a BL output with a threshold accuracy.

An example computer readable medium includes program instructions for which, when executed by an apparatus, cause the apparatus to perform at least the methods as described in any of the previous paragraphs.

The example computer readable medium may further include, wherein the computer readable medium is comprised in a non-transitory computer readable medium.

BRIEF DESCRIPTION OF THE DRAWINGS

The foregoing aspects and other features are explained in the following description, taken in connection with the accompanying drawings, wherein:

FIG. 3 further shows schematically electronic devices employing embodiments of the examples described herein connected using wireless and wired network connections.

FIG. 4 shows schematically a block diagram of an encoder on a general level.

FIG. 21 is an example apparatus, which may be implemented in hardware, caused to implement mechanisms for blending extra output pixels of a filter and/or decoder-side selection of filtering modes, based on the examples described herein.

FIG. 22 illustrates an example method for blending extra output pixels of a filter, in accordance with an embodiment.

DETAILED DESCRIPTION OF EXAMPLE EMBODIMENTS

Figure 2:
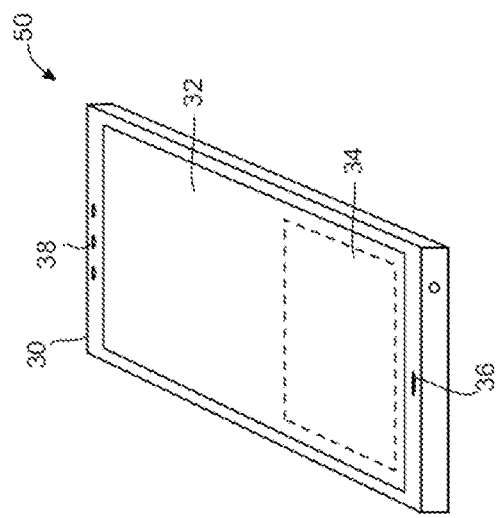
FIG. 2 shows schematically a user equipment suitable for employing embodiments of the examples described herein.

The following acronyms and abbreviations that may be found in the specification and/or the drawing figures are defined as follows:

3D-HEVC 3D extension of HEVC
3GP 3GPP file format
3GPP 3rd Generation Partnership Project
3GPP TS 3GPP technical specification
4CC four character code 4G fourth generation of broadband cellular network technology
5G fifth generation cellular network technology
5GC 5G core network
ACC accuracy
AGT approximated ground truth data
AI artificial intelligence
AIoT AI-enabled IoT
ALF adaptive loop filtering
a.k.a. also known as
AMF access and mobility management function
APS adaptation parameter set
AV1 AOMedia Video 1
AVC advanced video coding
bpp bits-per-pixel
CABAC context-adaptive binary arithmetic coding
CDMA code-division multiple access
CE core experiment
CTB coding tree block
ctu coding tree unit
CU central unit
CVS coded video sequence
DASH dynamic adaptive streaming over HTTP
DCT discrete cosine transform
decoded picture buffer DPB
DSP digital signal processor
DSNN decoder-side NN
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
FDC finetuning-driving content
GDR gradual decoding refresh
gNB (or gNodeB) base station for 5G/NR, for example, a node providing NR user plane and control plane protocol terminations towards the UE, and connected via the NG interface to the 5GC
GRA gradual random access
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
HQ high-quality
HEVC high efficiency video coding
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
IRAP intra random access point
ISO International Organization for Standardization
ISOBMFF ISO base media file format
ITU International Telecommunication Union
ITU-T ITU Telecommunication Standardization Sector
JPEG joint photographic experts group
LMCS luma mapping with chroma scaling
LPNN loss proxy NN
LQ low-quality
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
MSE mean square error
MV-HEVC multiview extension of HEVC
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PIR progressive intra refresh
PLC power line communication
PNG portable network graphics
PPS picture parameter set
PSNR peak signal-to-noise ratio
QP quantization power
RAM random access memory
RAN radio access network
RB SP raw byte sequence payload
RD loss rate distortion loss
RFC request for comments
RFID radio frequency identification
RLC radio link control
RRC radio resource control
RRH remote radio head
RU radio unit
Rx receiver
SDAP service data adaptation protocol
SGD Stochastic Gradient Descent
SGW serving gateway
SMF session management function
SMS short messaging service
SPS sequence parameter set
st(v) null-terminated string encoded as UTF-8 characters as specified in ISO/IEC 10646

SHVC scalable high efficiency video coding
SPS sequence parameter set
SVC scalable video coding
S1 interface between eNodeBs and the EPC
TCP-IP transmission control protocol-internet protocol
TDMA time divisional multiple access
trak TrackBox
TS transport stream
TUC technology under consideration
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VCL video coding layer
VPS video parameter set
VVC versatile video coding
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a 'computer-readable transmission medium,' which refers to an electromagnetic signal.

A method, apparatus and computer program product are provided in accordance with example embodiments for blending extra output pixels of a filter and/or decoder-side selection of filtering modes. An example of the filter includes a neural network filter.

Figure 1:
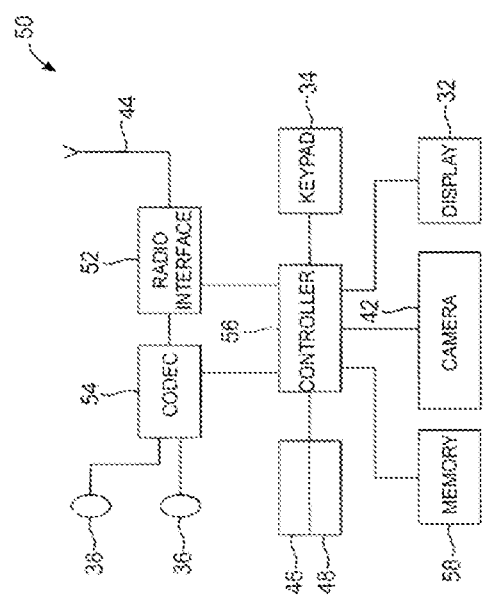
FIG. 1 shows schematically an electronic device employing embodiments of the examples described herein.

In an example, the following describes in detail suitable apparatus and possible mechanisms for blending extra output pixels of a filter and/or decoder-side selection of filtering modes. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data and video data, and/or may also store instructions for implementation on the controller 56. The controller 56 may further be connected to codec circuitry 54 suitable for carrying out coding and/or decoding of audio, image and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the Internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in internet of things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included in the IoT. In order to utilize the IoT devices are provided with an IP address as a unique identifier. The IoT devices may be provided with a radio transmitter, such as WLAN or Bluetooth transmitter or a RFID tag. Alternatively, the IoT devices may have access to an IP-based network via a wired network, such as an Ethernet-based network or a power-line connection (PLC).

The devices/systems described in FIGS. 1 to 3 enable encoding, decoding, and/or transportation of, for example, a neural network representation and/or a media bitstream.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form, or into a form that is suitable as an input to one or more algorithms for analysis or processing. A video encoder and/or a video decoder may also be separate from each other, for example, need not form a codec. Typically, encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly pixel values in a certain picture area (or 'block') are predicted, for example, by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer picture(s)/image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer image(s) 300. Correspondingly, the pixel predictor 402 of the second encoder section 502 receives enhancement layer picture(s)/images(s) 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer pictures 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector 310, 410 is passed to a first summing device 321, 421. The first summing device may subtract the output of the pixel predictor 302, 402 from the base layer image(s) 300/enhancement layer image(s) 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to the filter 316, 416. The filter 316, 416 receiving the preliminary representation may filter the preliminary representation and output a final reconstructed image 340, 440 which may be saved in the reference frame memory 318, 418. The reference frame memory 318 may be connected to the inter-predictor 306 to be used as the reference image against which a future base layer image 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer image(s) 400 is compared in inter-prediction operations. Moreover, the reference frame memory 418 may be connected to the inter-predictor 406 to be used as the reference image against which the future enhancement layer image(s) 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide a compressed signal. The outputs of the entropy encoders 330, 430 may be inserted into a bitstream, for example, by a multiplexer 508.

Figure 5:
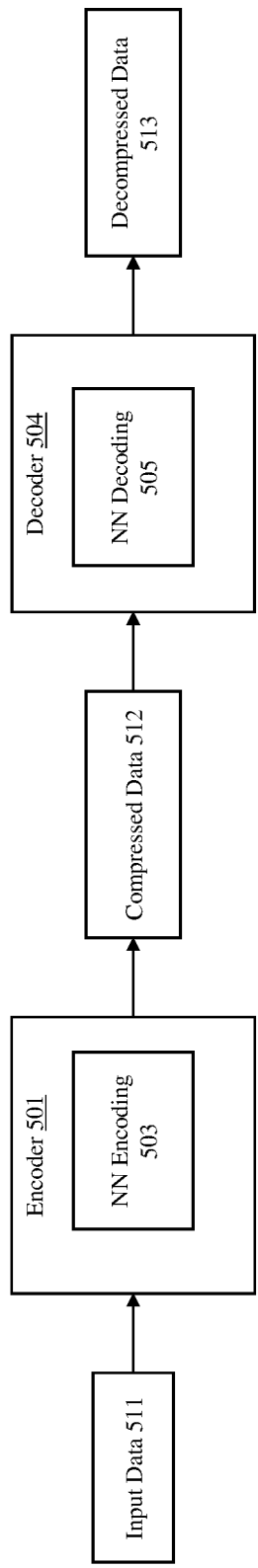
FIG. 5 is a block diagram showing an interface between an encoder and a decoder in accordance with the examples described herein.

FIG. 5 is a block diagram showing the interface between an encoder 501 implementing neural network based encoding 503, and a decoder 504 implementing neural network based decoding 505 in accordance with the examples described herein. The encoder 501 may embody a device, a software method or a hardware circuit. The encoder 501 has the goal of compressing an input data 511 (for example, an input video) to a compressed data 512 (for example, a bitstream) such that the bitrate measuring the size of compressed data 512 is minimized, and the accuracy of an analysis or processing algorithm is maximized. To this end, the encoder 501 uses an encoder or compression algorithm, for example to perform neural network based encoding 503, e.g., encoding the input data by using one or more neural networks.

The general analysis or processing algorithm may be part of the decoder 504. The decoder 504 uses a decoder or decompression algorithm, for example, to perform the neural network based decoding 505 (e.g., decoding by using one or more neural networks) to decode the compressed data 512 (for example, compressed video) which was encoded by the encoder 501. The decoder 504 produces decompressed data 513 (for example, reconstructed data).

The encoder 501 and decoder 504 may be entities implementing an abstraction, may be separate entities or the same entities, or may be part of the same physical device.

The analysis/processing algorithm may be any algorithm, traditional or learned from data. In the case of an algorithm which is learned from data, in some embodiments it is assumed that this algorithm can be modified or updated, for example, by using optimization via gradient descent. An example of the learned algorithm is a neural network.

An out-of-band transmission, signaling, or storage may refer to the capability of transmitting, signaling, or storing information in a manner that associates the information with a video bitstream. The out-of-band transmission may use a more reliable transmission mechanism compared to the protocols used for carrying coded video data, such as slices. The out-of-band transmission, signaling or storage can additionally or alternatively be used e.g. for ease of access or session negotiation. For example, a sample entry of a track in a file conforming to the ISO Base Media File Format may comprise parameter sets, while the coded data in the bitstream is stored elsewhere in the file or in another file. Another example of out-of-band transmission, signaling, or storage comprises including information, such as NN and/or NN updates in a file format track that is separate from track(s) containing coded video data.

The phrase along the bitstream (e.g. indicating along the bitstream) or along a coded unit of a bitstream (e.g. indicating along a coded tile) may be used in claims and described embodiments to refer to transmission, signaling, or storage in a manner that the 'out-of-band' data is associated with, but not included within, the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream. In another example, the phrase along the bitstream may be used when the bitstream is made available as a stream over a communication protocol and a media description, such as a streaming manifest, is provided to describe the stream.

An elementary unit for the output of a video encoder and the input of a video decoder, respectively, may be a network abstraction layer (NAL) unit. For transport over packet-oriented networks or storage into structured files, NAL units may be encapsulated into packets or similar structures. A bytestream format encapsulating NAL units may be used for transmission or storage environments that do not provide framing structures. The bytestream format may separate NAL units from each other by attaching a start code in front of each NAL unit. To avoid false detection of NAL unit boundaries, encoders may run a byte-oriented start code emulation prevention algorithm, which may add an emulation prevention byte to the NAL unit payload if a start code would have occurred otherwise. In order to enable straightforward gateway operation between packet and stream-oriented systems, start code emulation prevention may be performed regardless of whether the bytestream format is in use or not. A NAL unit may be defined as a syntax structure containing an indication of the type of data to follow and bytes containing that data in the form of a raw byte sequence payload interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

In some coding formats, such as AV1, a bitstream may comprise a sequence of open bitstream units (OBUs). An OBU comprises a header and a payload, wherein the header identifies a type of the OBU. Furthermore, the header may comprise a size of the payload in bytes.

In some coding standards, NAL units consist of a header and payload. The NAL unit header indicates the type of the NAL unit. In some coding standards, the NAL unit header indicates a scalability layer identifier (e.g. called nuh_layer_id in H.265/HEVC and H.266/VVC), which could be used e.g. for indicating spatial or quality layers, views of a multiview video, or auxiliary layers (such as depth maps or alpha planes). In some coding standards, the NAL unit header includes a temporal sublayer identifier, which may be used for indicating temporal subsets of the bitstream, such as a 30-frames-per-second subset of a 60-frames-per-second bitstream.

NAL units may be categorized into Video Coding Layer (VCL) NAL units and non-VCL NAL units. VCL NAL units are typically coded slice NAL units.

A non-VCL NAL unit may be, for example, one of the following types: a video parameter set (VPS), a sequence parameter set (SPS), a picture parameter set (PPS), an adaptation parameter set (APS), a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure, for example, using an identifier.

Some types of parameter sets are briefly described in the following, but it needs to be understood, that other types of parameter sets may exist and that embodiments may be applied, but are not limited to, the described types of parameter sets.

Parameters that remain unchanged through a coded video sequence may be included in a sequence parameter set. Alternatively, an SPS may be limited to apply to a layer that references the SPS, e.g. an SPS may remain valid for a coded layer video sequence. In addition to the parameters that may be needed by the decoding process, the sequence parameter set may optionally contain video usability information (VUI), which includes parameters that may be important for buffering, picture output timing, rendering, and resource reservation.

A picture parameter set contains such parameters that are likely to be unchanged in several coded pictures. A picture parameter set may include parameters that can be referred to by the VCL NAL units of one or more coded pictures.

A video parameter set (VPS) may be defined as a syntax structure containing syntax elements that apply to zero or more entire coded video sequences and may contain parameters applying to multiple layers. The VPS may provide information about the dependency relationships of the layers in a bitstream, as well as many other information that are applicable to all slices across all layers in the entire coded video sequence.

A video parameter set RBSP may include parameters that can be referred to by one or more sequence parameter set RBSPs.

The relationship and hierarchy between a video parameter set (VPS), a sequence parameter set (SPS), and a picture parameter set (PPS) may be described as follows. A VPS resides one level above an SPS in the parameter set hierarchy and in the context of scalability. The VPS may include parameters that are common for all slices across all layers in the entire coded video sequence. The SPS includes the parameters that are common for all slices in a particular layer in the entire coded video sequence, and may be shared by multiple layers. The PPS includes the parameters that are common for all slices in a particular picture and are likely to be shared by all slices in multiple pictures.

An adaptation parameter set (APS) may be specified in some coding formats, such as H.266/VVC. An APS may be applied to one or more image segments, such as slices. In H.266/VVC, an APS may be defined as a syntax structure containing syntax elements that apply to zero or more slices as determined by zero or more syntax elements found in slice headers or in a picture header. An APS may comprise a type (aps_params_type in H.266/VVC) and an identifier (aps_adaptation_parameter_set_id in H.266/VVC). The combination of an APS type and an APS identifier may be used to identify a particular APS. H.266/VVC comprises three APS types: an adaptive loop filtering (ALF), a luma mapping with chroma scaling (LMCS), and a scaling list APS types. The ALF APS(s) are referenced from a slice header (thus, the referenced ALF APS s can change slice by slice), and the LMCS and scaling list APS(s) are referenced from a picture header (thus, the referenced LMCS and scaling list APSs can change picture by picture). In H.266/VVC, the APS RBSP has the following syntax:

|  | Descriptor |
|---|---|
| adaptation_parameter_set_rbsp( ) { | |
|   aps_params_type | u(3) |
|   aps_adaptation_parameter_set_id | u(5) |
|   aps_chroma_present_flag | u(1) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Video coding specifications may enable the use of supplemental enhancement information (SEI) messages or alike. Some video coding specifications include SEI NAL units, and some video coding specifications contain both prefix SEI NAL units and suffix SEI NAL units. A prefix SEI NAL unit can start a picture unit or alike; and a suffix SEI NAL unit can end a picture unit or alike. Hereafter, an SEI NAL unit may equivalently refer to a prefix SEI NAL unit or a suffix SEI NAL unit. An SEI NAL unit includes one or more SEI messages, which are not required for the decoding of output pictures but may assist in related processes, such as picture output timing, post-processing of decoded pictures, rendering, error detection, error concealment, and resource reservation.

Several SEI messages are specified in H.264/AVC, H.265/HEVC, H.266/VVC, and H.274/VSEI standards, and the user data SEI messages enable organizations and companies to specify SEI messages for specific use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Some video coding specifications enable metadata OBUs. A metadata OBU comprises a type field, which specifies the type of metadata.

Figure 6:
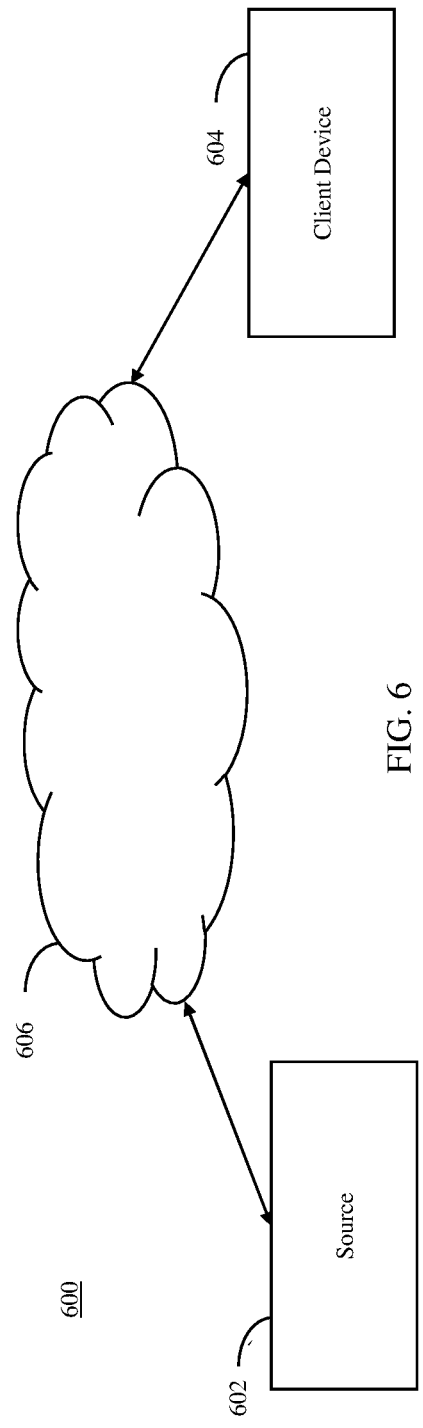
FIG. 6 illustrates a system configured to support streaming of media data from a source to a client device.

The method and apparatus of an example embodiment may be utilized in a wide variety of systems, including systems that rely upon the compression and decompression of media data and possibly also the associated metadata. In at least an embodiment, however, the method and apparatus are configured to train or finetune a decoder-side neural network. In this regard, FIG. 6 depicts an example of such a system 600 that includes a source 602 of media data and associated metadata. The source 602 may be, in an embodiment, a server. However, the source may be embodied in other manners when desired. The source 602 is configured to stream the media data and associated metadata to a client device 604. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, media data and metadata are streamed via a network 606, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 7:
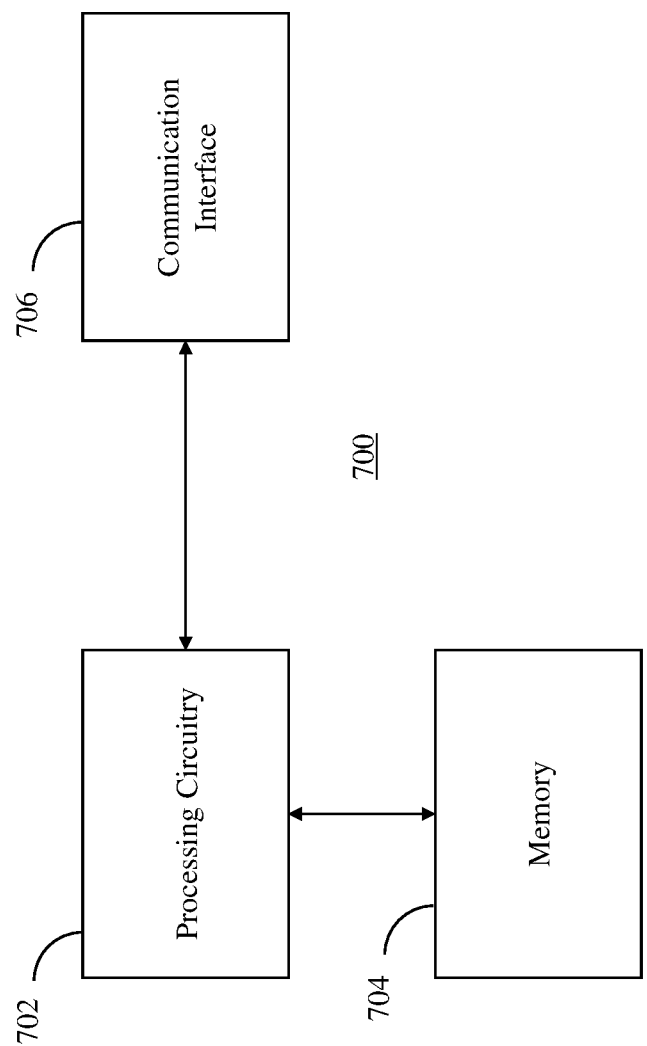
FIG. 7 is a block diagram of an apparatus that may be specifically configured in accordance with an example embodiment.

An apparatus 700 is provided in accordance with an example embodiment as shown in FIG. 7. In an embodiment, the apparatus of FIG. 7 may be embodied by the source 602, such as a file writer which, in turn, may be embodied by a server, that is configured to stream a compressed representation of the media data and associated metadata. In an alternative embodiment, the apparatus may be embodied by the client device 604, such as a file reader which may be embodied, for example, by any of the various computing devices described above. In either of these embodiments and as shown in FIG. 7, the apparatus of an example embodiment includes, is associated with or is in communication with a processing circuitry 702, one or more memory devices 704, a communication interface 706 and optionally a user interface.

The processing circuitry 702 may be in communication with the memory device 704 via a bus for passing information among components of the apparatus 700. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 700 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single 'system on a chip.' As such, in some cases, a chip or chipset may constitute means for performing one or more operations for providing the functionalities described herein.

The processing circuitry 702 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 702 may be configured to execute instructions stored in the memory device 704 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 706 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 700 may optionally include a user interface that may, in turn, be in communication with the processing circuitry 702 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Fundamentals of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they are able to learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

If the network is learning at all—in this case, the training set error should decrease, otherwise the model is in the regime of underfitting.

If the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized properties of the training set and performs well only on that set, but performs poorly on a set not used for training or tuning of its parameters.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion may be based on one or more of the following metrics: mean squared error (MSE), peak signal-to-noise ratio (PSNR), structural similarity index measure (SSIM), or the like. These distortion metrics are meant to be correlated to the human visual perception quality, so that minimizing or maximizing one or more of these distortion metrics results into improving the visual quality of the decoded image as perceived by humans.

In various embodiments, terms 'model', 'neural network', 'neural net' and 'network' may be used interchangeably, and also the weights of neural networks may be sometimes referred to as learnable parameters or as parameters.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or 'block') are predicted, for example, by motion compensation means or circuits (by finding and indicating an area in one of the previously coded video frames that corresponds closely to the block being coded) or by spatial means or circuit (by using the pixel values around the block to be coded in a specified manner). Secondly the prediction error, e.g. the difference between the predicted block of pixels and the original block of pixels, is coded. This is typically done by transforming the difference in pixel values using a specified transform (e.g. discrete cosine transform (DCT) or a variant of it), quantizing the coefficients and entropy coding the quantized coefficients. By varying the fidelity of the quantization process, the encoder may control the balance between the accuracy of the pixel representation (e.g., picture quality) and size of the resulting coded video representation (e.g., file size or transmission bitrate).

In other example, the pixel values may be predicted by using spatial prediction techniques. This prediction technique uses the pixel values around the block to be coded in a specified manner secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain. After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently, the motion vectors are typically coded differentially with respect to block specific predicted motion vectors. In typical video codecs, the predicted motion vectors are created in a predefined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired macroblock mode and associated motion vectors. This kind of cost function uses a weighting factor $\lambda$ to tie together the exact or estimated image distortion due to lossy coding methods and the exact or estimated amount of information that is required to represent the pixel values in an image area:

$$C = D + \lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Video coding specifications may comprise one or more block partitioning schemes. As an example, in VVC, pictures are partitioned into coding tree units (CTUs). The maximum CTU size is 128×128 (in luma samples). An encoder may select a CTU size CtbSizeY on a sequence basis from values supported in the VVC standard (32, 64, 128), or the encoder may be configured to use a certain CtbSizeY value. A CTU comprises either a coding tree block (CTB) of luma samples and two corresponding CTBs of chroma samples of a picture that has three sample arrays, or a CTB of samples of a monochrome picture, and syntax structures used to code the samples.

In VVC, each CTB is assigned a partition signalling to identify the block sizes for intra or inter prediction and for transform coding. The partitioning is a recursive quadtree partitioning. The root of the quadtree is associated with the CTB. The quadtree is split until a leaf is reached, which is referred to as the quadtree leaf. The root of the multi-type tree is associated with the quadtree leaf. The multi-type tree is split using horizontal or vertical binary splits or horizontal or vertical ternary splits until a leaf is reached, which is associated with the coding block. The coding block is the root node of the transform tree. The transform tree specifies the position and size of transform blocks. The splitting information for luma and chroma might or might not be identical for the transform tree. When the component width is not an integer number of the CTB size, the CTBs at the right component boundary are incomplete. When the component height is not an integer multiple of the CTB size, the CTBs at the bottom component boundary are incomplete.

In VVC, a transform block, a coding block, and a coding tree block as well as the associated syntax structures are grouped into transform unit, coding unit, and coding tree unit structures, respectively, as follows:

One transform block (monochrome picture) or three transform blocks (luma and chroma components of a picture in 4:2:0, 4:2:2 or 4:4:4 colour format) and the associated transform syntax structures units are associated with a transform unit (TU).

One coding block (monochrome picture) or three coding blocks (luma and chroma), the associated coding syntax structures and the associated transform units are associated with a coding unit (CU).

One CTB (monochrome picture) or three CTBs (luma and chroma), the associated coding tree syntax structures and the associated coding units are associated with a CTU.

A superblock in AV1 is similar to a CTU in VVC. A superblock may be regarded as the largest coding block that the AV1 specification supports. The size of the superblock is signaled in the sequence header to be 128×128 or 64×64 luma samples. A superblock may be partitioned into smaller coding blocks recursively. A coding block may have its own prediction and transform modes, independent of those of the other coding blocks.

In the following, partitioning a picture into subpictures, slices, and tiles according to H.266/VVC is described more in detail similar concepts may apply in other video coding specifications too.

A picture is divided into one or more tile rows and one or more tile columns. A tile is a sequence of coding tree units (CTU) that covers a rectangular region of a picture. The CTUs in a tile are scanned in raster scan order within that tile.

A slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture may be defined as a rectangular region of one or more slices within a picture, wherein the one or more slices are complete. Thus, a subpicture consists of one or more slices that collectively cover a rectangular region of a picture. Consequently, each subpicture boundary is also always a slice boundary, and each vertical subpicture boundary is also a vertical tile boundary. The slices of a subpicture may be required to be rectangular slices.

One or both of the following conditions may be required to be fulfilled for each subpicture and tile: i) All CTUs in a subpicture belong to the same tile. ii) All CTUs in a tile belong to the same subpicture.

An independent VVC subpicture is treated like a picture in the VVC decoding process. Moreover, it may additionally be required that loop filtering across the boundaries of an independent VVC subpicture is disabled. Boundaries of a subpicture are treated like picture boundaries in the VVC decoding process when sps_subpic_treated_as_pic_flag[i] is equal to 1 for the subpicture. Loop filtering across the boundaries of a subpicture is disabled in the VVC decoding process when sps_loop_filter_across_subpic_enabled_pic_flag[i] is equal to 0.

In VVC, the feature of subpictures enables efficient extraction of subpicture(s) from one or more bitstream and merging the extracted subpictures to form another bitstream without excessive penalty in compression efficiency and without modifications of VCL NAL units (e.g., slices).

The use of subpictures in a coded video sequence (CVS), however, requires appropriate configuration of the encoder and other parameters such as SPS/PPS, and so on. In VVC, a layout of partitioning of a picture to subpictures may be indicated in and/or decoded from an SPS. A subpicture layout may be defined as a partitioning of a picture to subpictures. In VVC, the SPS syntax indicates the partitioning of a picture to subpictures by providing for each subpicture syntax elements indicative of: the x and y coordinates of the top-left corner of the subpicture, the width of the subpicture, and the height of the subpicture, in CTU units. One or more of the following properties may be indicated (e.g., by an encoder) or decoded (e.g., by a decoder) or inferred (e.g., by an encoder and/or a decoder) for the subpictures collectively or per each subpicture individually: i) whether or not a subpicture is treated like a picture in the decoding process (or equivalently, whether or not subpicture boundaries are treated like picture boundaries in the decoding process); in some cases, this property excludes in-loop filtering operations, which may be separately indicated/decoded/inferred; ii) whether or not in-loop filtering operations are performed across the subpicture boundaries. When a subpicture is treated like a picture in the decoding process, any references to sample locations outside the subpicture boundaries are saturated to be within the subpicture boundaries. This may be regarded being equivalent to padding samples outside subpicture boundaries with the boundary sample values for decoding the subpicture. Consequently, motion vectors may be allowed to cause references outside subpicture boundaries in a subpicture that is extractable.

An independent subpicture (a.k.a. an extractable subpicture) may be defined as a subpicture with subpicture boundaries that are treated as picture boundaries. Additionally, it may be required that an independent subpicture has no loop filtering across the subpicture boundaries. A dependent subpicture may be defined as a subpicture that is not an independent subpicture.

Note that it may be allowed to have adjacent subpictures where loop filtering across subpicture boundaries of one subpicture is disabled while loop filtering across subpicture boundaries of the other subpicture is enabled.

In the following, partitioning a picture into tiles and tile groups according to AV1 is described more in detail similar concepts may apply in other video coding specifications too.

A tile consists of an integer number of complete superblocks that collectively form a complete rectangular region of a picture. In-picture prediction across tile boundaries is disabled. The minimum tile size is one superblock, and the maximum tile size in the presently specified levels is 4096× 2304 in terms of luma sample count. The picture is partitioned a tile grid into one or more tile rows and one or more tile columns. The tile grid may be signalled in the picture header to have a uniform tile size or nonuniform tile size, where in the latter case the tile row heights and tile column widths are signalled. The superblocks in a tile are scanned in raster scan order within that tile.

A tile group OBU carries one or more complete tiles. The first and last tiles of in the tile group OBU may be indicated in the tile group OBU before the coded tile data. Tiles within a tile group OBU may appear in a tile raster scan of a picture.

Gradual decoding refresh (GDR) often refers to the ability to start decoding at a non-intra picture and to recover decoded pictures that are correct in content after decoding a certain number of pictures. Said otherwise, GDR can be used to achieve random access from non-intra pictures. GDR, which is also known as gradual random access (GRA) or progressive intra refresh (PIR), alleviates the delay issue with intra coded pictures. Instead of coding an intra picture at a random access point, GDR progressively refreshes pictures by spreading intra coded regions (groups of intra coded blocks) over several pictures.

A GDR picture may be defined as a random access picture that, when used to start the decoding process, enables recovery of exactly or approximately correct decoded pictures starting from a specific picture, known as the recovery point picture. It is possible to start decoding from a GDR picture.

In some video coding formats, such as VVC, all video coding layer (VCL) network abstraction layer (NAL) units of a GDR picture may have a particular NAL unit type value that indicates a GDR NAL unit.

In some video coding formats, an SEI message, a metadata OBU or alike with a particular type, such as a recovery point SEI message of HEVC, may be used to indicate a GDR picture and/or a recovery point picture.

A recovery point may be indicated within a GDR picture, e.g., as a picture order count (POC) difference compared to the POC of the GDR picture. When the decoding started from the GDR picture, the decoded recovery point picture and all subsequent decoded pictures in output order are correct in content.

Pictures between the GDR picture (exclusive) and the recovery point picture (exclusive), in decoding order, may be referred to as recovering pictures. Recovering pictures may be partially correct in content, when the decoding started from the GDR picture.

It may be allowed that the recovery point picture is the same picture as the GDR picture (and consequently there are no recovering pictures). In this case, there may be pictures that follow the GDR picture in decoding order and precede the GDR picture in output order that are not correctly decodable when the decoding is started from the GDR picture.

The GDR picture and the recovering pictures may be considered to have at least two regions (which may also or alternatively be called areas and/or portions), a refreshed region (a.k.a. a clean region, a clean area, or a refreshed area) and a unrefreshed region (a.k.a. a dirty region, a dirty area, or an unrefreshed area). The refreshed region can be exactly or approximately correctly decoded when the decoding is started from the GDR picture, while the decoded unrefreshed region might not be correct in content when the decoding is started from the GDR picture. A GDR picture may include a clean region and a dirty region, where the refreshed region may be intra-coded. Inter prediction used for encoding of a refreshed region in a recovering picture may be constrained so that the refreshed region may only inter-predicted from the refreshed region of the reference pictures within the same refresh period from the GDR picture to the recovery point picture, e.g., sample values of the unrefreshed region are not used in inter prediction of the refreshed region. Since the refreshed region in a picture may be larger than the refreshed region in the previous pictures, the intra coding may be used for the coding block locations that are newly added in the refreshed region compared to the refreshed regions of earlier pictures in the same refresh period. In some implementations, a clean region in a recovering picture may comprise a forced intra-coded area for the coding block locations that are newly added in the refreshed region compared to the refreshed regions of earlier pictures in the same refresh period, while in other implementations, rate-distortion-optimized mode selection may be applied for the newly added coding block locations too as long as inter prediction constraints discussed above are obeyed.

Filters in Video Codecs

Conventional image and video codecs may use a set of filters to enhance the visual quality of the predicted and error-compensated visual content and can be applied either in-loop or out-of-loop, or both. In the case of in-loop filters, a filter applied on one block in the currently-encoded or currently decoded frame will affect the encoding or decoding of another block in the same frame and/or in another frame which is predicted or processed based at least on the current frame. An in-loop filter can affect the bitrate and/or the visual quality. An enhanced block may cause a smaller residual, e.g., a smaller difference between original block and filtered block, thus using less bits in the bitstream output by the encoder. An out-of-loop filter, or post-processing filter, may be applied on a frame or part of a frame after it has been reconstructed; the filtered visual content may not be used for decoding other content.

Scalable Video Coding

Scalable video coding may refer to coding structure where one bitstream may include multiple representations of the content, for example, at different bitrates, resolutions or frame rates. In these cases the receiver may extract the desired representation depending on its characteristics (e.g., resolution that matches best the display device). Alternatively, a server or a network element may extract the portions of the bitstream to be transmitted to the receiver depending on, e.g., the network characteristics or processing capabilities of the receiver. A meaningful decoded representation may be produced by decoding only certain parts of a scalable bit stream. A scalable bitstream typically consists of a 'base layer' providing the lowest quality video available and one or more enhancement layers that enhance the video quality when received and decoded together with the lower layers. In order to improve coding efficiency for the enhancement layers, the coded representation of that layer typically depends on the lower layers. For example, the motion and mode information of the enhancement layer can be predicted from lower layers. Similarly, the pixel data of the lower layers can be used to create prediction for the enhancement layer.

In some scalable video coding schemes, a video signal can be encoded into a base layer and one or more enhancement layers. An enhancement layer may enhance, for example, the temporal resolution (e.g., the frame rate), the spatial resolution, or simply the quality of the video content represented by another layer or part thereof. Each layer together with all its dependent layers is one representation of the video signal, for example, at a certain spatial resolution, temporal resolution and quality level. In this document, a scalable layer together with all of its dependent layers are referred to as a 'scalable layer representation'. The portion of a scalable bitstream corresponding to a scalable layer representation can be extracted and decoded to produce a representation of the original signal at certain fidelity.

Scalability modes or scalability dimensions may include, but are not limited, to the following:

Quality scalability: Base layer pictures are coded at a lower quality than enhancement layer pictures, which may be achieved, for example, by using a greater quantization parameter value (e.g., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (e.g., have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, e.g., restarting the transmission of one or more layers whose transmission was ceased earlier in layer down-switching. Similar to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (e.g., virtually simultaneously) or may be carried out in different access units or alike (e.g., virtually at distinct times).

A scalable video encoder for quality scalability (also known as signal-to-noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example, from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the decoded picture buffer (DPB). An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Information on Neural Network Based Image/Video Coding

Recently, neural networks (NNs) have been used in the context of image and video compression, by following mainly two approaches.

In one approach, NNs are used to replace or are used as an addition to one or more of the components of a traditional codec such as VVC/H.266. Here, 'traditional' means those codecs whose components and parameters are typically not learned from data by means of a training process, for example, those codecs whose components are not neural networks. Some examples of uses of neural networks within a traditional codec include but are not limited to:

Additional in-loop filter, for example, by having the NN as an additional in-loop filter with respect to the traditional loop filters;

Single in-loop filter, for example, by having the NN replacing all traditional in-loop filters;

Intra-frame prediction, for example, as an additional intra-frame prediction mode, or replacing the traditional intra-frame prediction;

Inter-frame prediction, for example, as an additional inter-frame prediction mode, or replacing the traditional inter-frame prediction;

Transform and/or inverse transform, for example, as an additional transform and/or inverse transform, or replacing the traditional transform and/or inverse transform; and Probability model for the arithmetic codec, for example, as an additional probability model, or replacing the traditional probability model.

Figure 8:
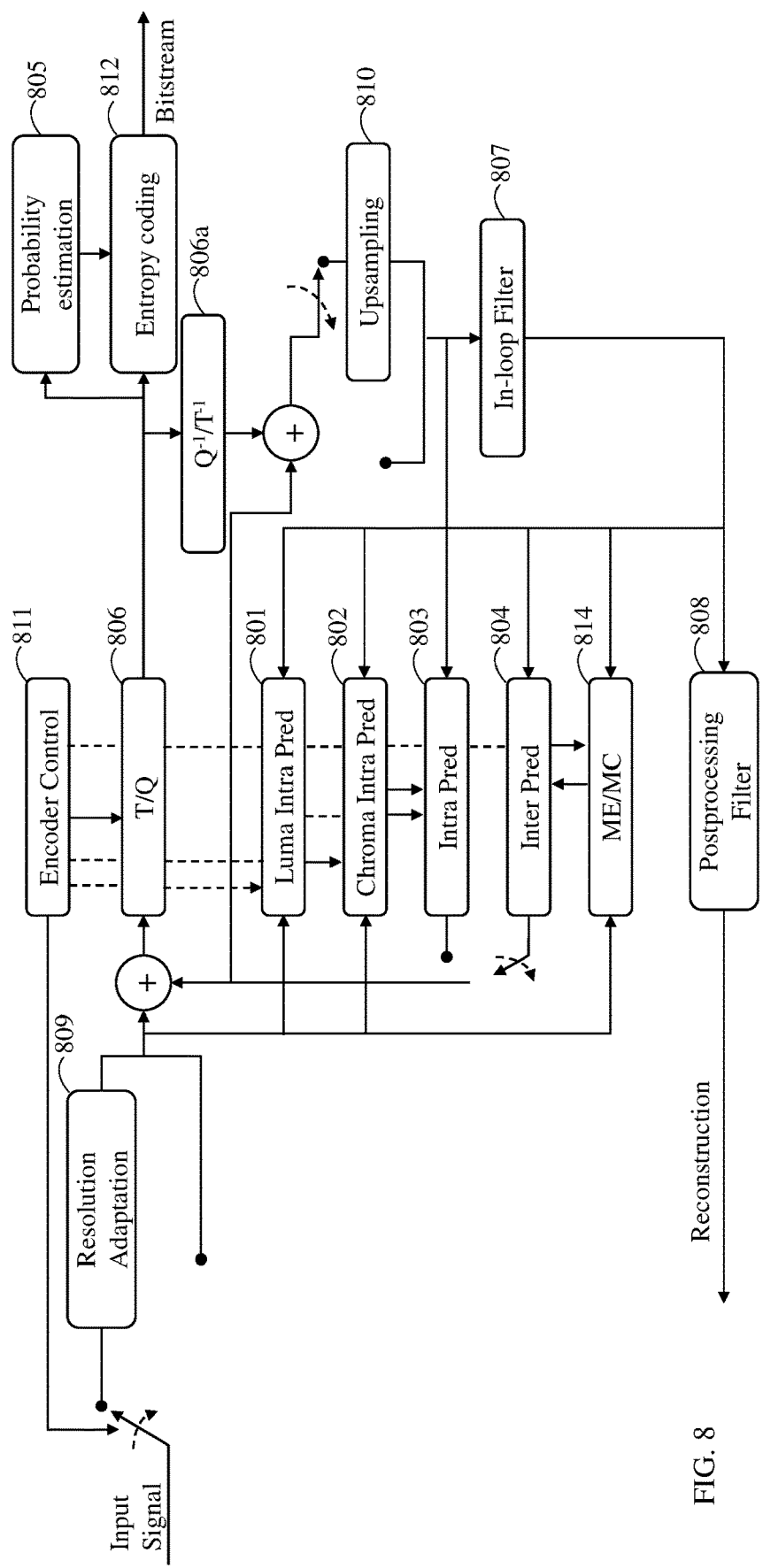
FIG. 8 illustrates examples of functioning of neural networks (NNs) as components of a pipeline of a traditional codec, in accordance with an example embodiment.
Figure 9:
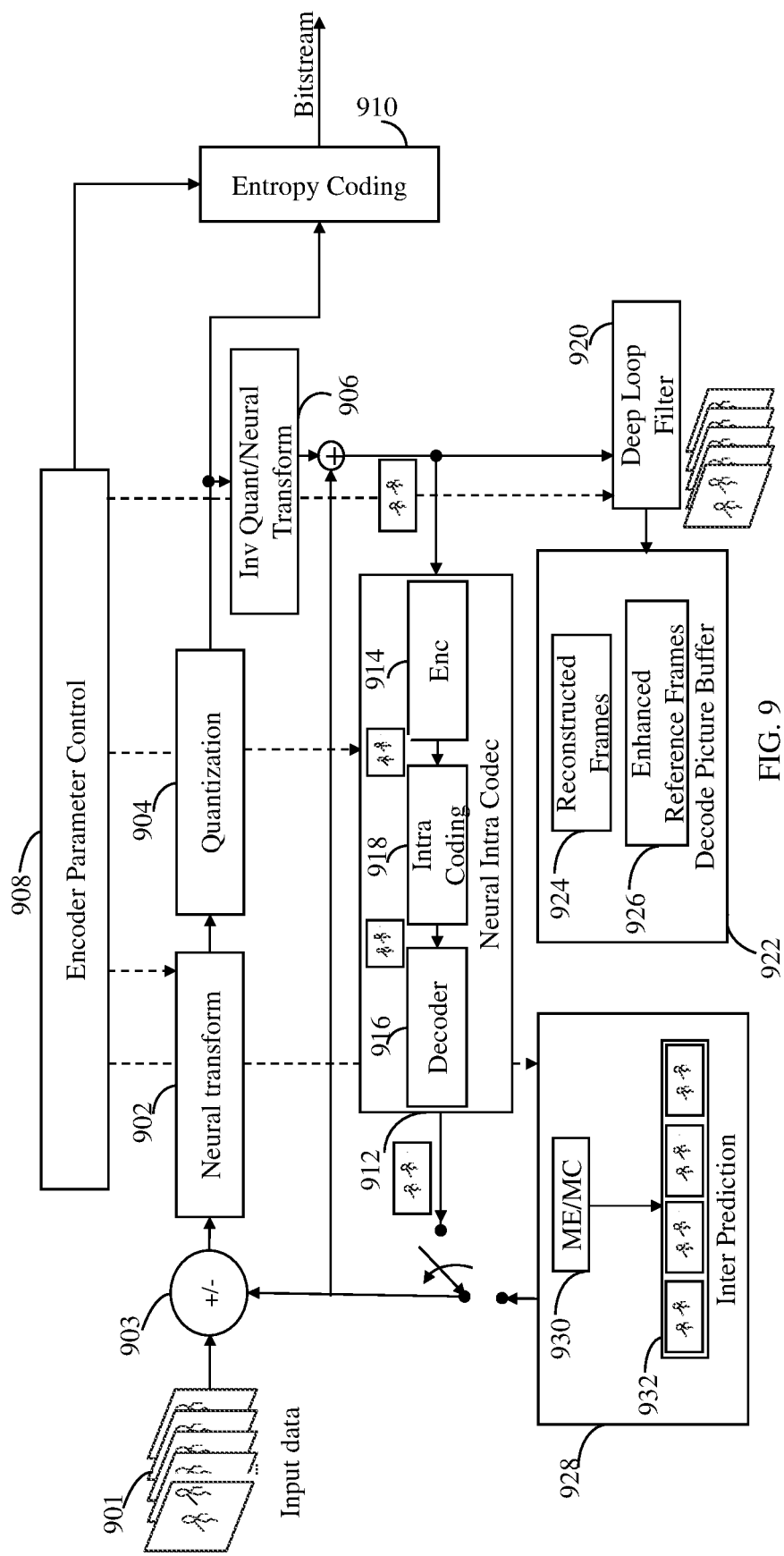
FIG. 9 illustrates an example of modified video coding pipeline based on neural networks, in accordance with an example embodiment.

FIG. 8 illustrates examples of functioning of NNs as components of a pipeline of traditional codec, in accordance with an embodiment. In particular, FIG. 8 illustrates an encoder, which also includes a decoding loop. FIG. 8 is shown to include components described below:

- A luma intra pred block or circuit 801. This block or circuit performs intra prediction in the luma domain, for example, by using already reconstructed data from the same frame. The operation of the luma intra pred block or circuit 801 may be performed by a deep neural network such as a convolutional auto-encoder.
- A chroma intra pred block or circuit 802. This block or circuit performs intra prediction in the chroma domain, for example, by using already reconstructed data from the same frame. The chroma intra pred block or circuit 802 may perform cross-component prediction, for example, predicting chroma from luma. The operation of the chroma intra pred block or circuit 802 may be performed by a deep neural network such as a convolutional auto-encoder.
- An intra pred block or circuit 803 and an inter-pred block or circuit 804. These blocks or circuit perform intra prediction and inter-prediction, respectively. The intra pred block or circuit 803 and the inter-pred block or circuit 804 may perform the prediction on all components, for example, luma and chroma. The operations of the intra pred block or circuit 803 and the inter-pred block or circuit 804 may be performed by two or more deep neural networks such as convolutional auto-encoders.
- A probability estimation block or circuit 805 for entropy coding. This block or circuit performs prediction of probability for the next symbol to encode or decode, which is then provided to the entropy coding module 812, such as an arithmetic coding module, to encode or decode the next symbol. The operation of the probability estimation block or circuit 805 may be performed by a neural network.
- A transform and quantization (T/Q) block or circuit 806. These are actually two blocks or circuits. The transform and quantization block or circuit 806 may perform a transform of input data to a different domain, for example, the FFT transform would transform the data to frequency domain. The transform and quantization block or circuit 806 may quantize its input values to a smaller set of possible values. In the decoding loop, there may be inverse quantization block or circuit and inverse transform block or circuit $Q^{-1}/T^{-1}$ 806a. One or both of the transform block or circuit and quantization block or circuit may be replaced by one or two or more neural networks. One or both of the inverse transform block or circuit and inverse quantization block or circuit 813 may be replaced by one or two or more neural networks.
- An in-loop filter block or circuit 807. Operations of the in-loop filter block or circuit 807 is performed in the decoding loop, and it performs filtering on the output of the inverse transform block or circuit, or on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 807 may be performed by a neural network, such as a convolutional auto-encoder. In examples, the operation of the in-loop filter may be performed by multiple steps or filters, where the one or more steps may be performed by neural networks.
- A post-processing filter block or circuit 808. The post-processing filter block or circuit 808 may be performed only at decoder side, as it may not affect the encoding process. The post-processing filter block or circuit 808 filters the reconstructed data output by the in-loop filter block or circuit 807, in order to enhance the reconstructed data. The post-processing filter block or circuit 808 may be replaced by a neural network, such as a convolutional auto-encoder.
- A resolution adaptation block or circuit 809: this block or circuit may downsample the input video frames, prior to encoding. Then, in the decoding loop, the reconstructed data may be upsampled, by the upsampling block or circuit 810, to the original resolution. The operation of the resolution adaptation block or circuit 809 block or circuit may be performed by a neural network such as a convolutional auto-encoder.
- An encoder control block or circuit 811. This block or circuit performs optimization of encoder's parameters, such as what transform to use, what quantization parameters (QP) to use, what intra-prediction mode (out of N intra-prediction modes) to use, and the like. The operation of the encoder control block or circuit 811 may be performed by a neural network, such as a classifier convolutional network, or such as a regression convolutional network.
- An ME/MC block or circuit 814 performs motion estimation and/or motion compensation, which are two key operations to be performed when performing inter-frame prediction. ME/MC stands for motion estimation/motion compensation In another approach, commonly referred to as 'end-to-end learned compression', NNs are used as the main components of the image/video codecs. In this second approach, there are following two example options:

Option 1: re-use the video coding pipeline but replace most or all the components with NNs. Referring to FIG. 9, it illustrates an example of modified video coding pipeline based on neural networks, in accordance with an embodiment. An example of neural network may include, but is not limited, a compressed representation of a neural network. FIG. 9 is shown to include following components:

- A neural transform block or circuit 902: this block or circuit transforms the output of a summation/subtraction operation 903 to a new representation of that data, which may have lower entropy and thus be more compressible.
- A quantization block or circuit 904: this block or circuit quantizes an input data 901 to a smaller set of possible values.
- An inverse transform and inverse quantization blocks or circuits 906. These blocks or circuits perform the inverse or approximately inverse operation of the transform and the quantization, respectively.
- An encoder parameter control block or circuit 908. This block or circuit may control and optimize some or all the parameters of the encoding process, such as parameters of one or more of the encoding blocks or circuits.
- An entropy coding block or circuit 910. This block or circuit may perform lossless coding, for example, based on entropy. One popular entropy coding technique is arithmetic coding.
- A neural intra-codec block or circuit 912. This block or circuit may be an image compression and decompression block or circuit, which may be used to encode and decode an intra frame. An encoder 914 may be an encoder block or circuit, such as the neural encoder part of an auto-encoder neural network. A decoder 916 may be a decoder block or circuit, such as the neural decoder part of an auto-encoder neural network. An intra-coding block or circuit 918 may be a block or circuit performing some intermediate steps between encoder and decoder, such as quantization, entropy encoding, entropy decoding, and/or inverse quantization.

A deep loop filter block or circuit 920. This block or circuit performs filtering of reconstructed data, in order to enhance it.

A decode picture buffer block or circuit 922. This block or circuit is a memory buffer, keeping the decoded frame, for example, reconstructed frames 924 and enhanced reference frames 926 to be used for inter prediction.

An inter-prediction block or circuit 928. This block or circuit performs inter-frame prediction, for example, predicts from frames, for example, frames 932, which are temporally nearby. An ME/MC 930 performs motion estimation and/or motion compensation, which are two key operations to be performed when performing inter-frame prediction. ME/MC stands for motion estimation/motion compensation.

In order to train the neural networks of this system, a training objective function, referred to as 'training loss', is typically utilized, which usually comprises one or more terms, or loss terms, or simply losses. Although here the Option 2 and FIG. 10 considered as example for describing the training objective function, a similar training objective function may also be used for training the neural networks for the systems in FIG. 6 and FIG. 7. In an example, the training loss comprises a reconstruction loss term and a rate loss term. The reconstruction loss encourages the system to decode data that is similar to the input data, according to some similarity metric. Following are some examples of reconstruction losses are:

a loss derived from mean squared error (MSE);

a loss derived from multi-scale structural similarity (MS-SSIM), such as 1 minus MS-SSIM, or 1−MS-SSIM;

losses derived from the use of a pretrained neural network. For example, error(f1, f2), where f1 and f2 are the features extracted by a pretrained neural network for the input (uncompressed) data and the decoded (reconstructed) data, respectively, and error( ) is an error or distance function, such as L1 norm or L2 norm; and losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

The rate loss encourages the system to compress the output of the encoding stage, such as the output of the arithmetic encoder. 'Compressing' for example, means reducing the number of bits output by the encoding stage.

When an entropy-based lossless encoder is used, such as the arithmetic encoder, the rate loss typically encourages the output of the Encoder NN to have low entropy. The rate loss may be computed on the output of the Encoder NN, or on the output of the quantization operation, or on the output of the probability model. Following are some examples of rate losses are the following:

A differentiable estimate of the entropy;

A sparsification loss, for example, a loss that encourages the output of the Encoder NN or the output of the quantization to have many zeros. Examples are L0 norm, L1 norm, L1 norm divided by L2 norm; and A cross-entropy loss applied to the output of a probability model, where the probability model may be a NN used to estimate the probability of the next symbol to be encoded by the arithmetic encoder.

For training one or more neural networks that are part of a codec, such as one or more neural networks in FIG. 8 and/or FIG. 9, one or more of reconstruction losses may be used, and one or more of rate losses may be used. The loss terms may then be combined for example as a weighted sum to obtain the training objective function. Typically, the different loss terms are weighted using different weights, and these weights determine how the final system performs in terms of rate-distortion loss. For example, when more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

For the sake of explanation, video is considered as data type in various embodiments. However, it would be understood that the embodiments are also applicable to other media items, for example, images and audio data.

Figure 10:
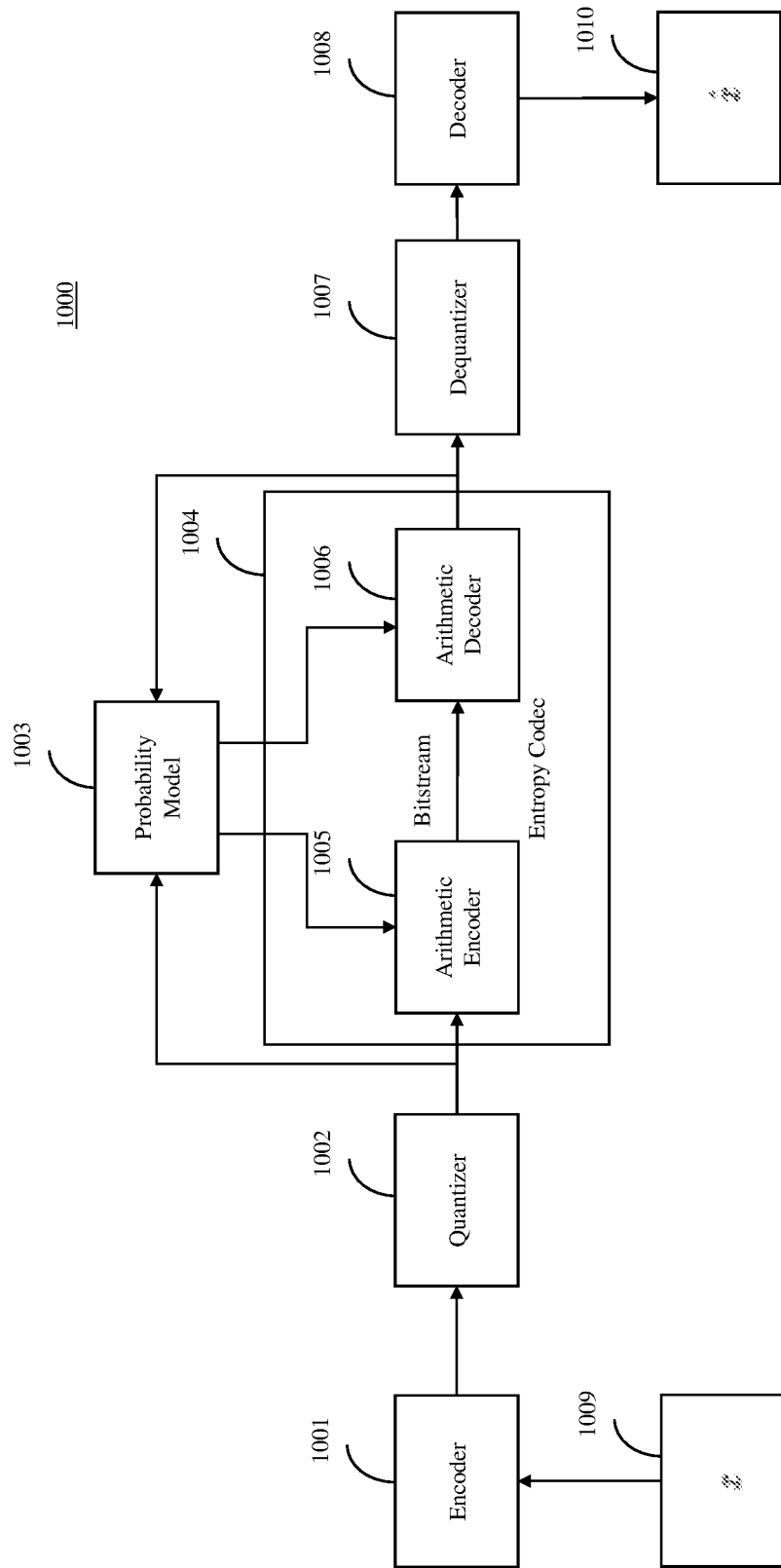
FIG. 10 is an example neural network-based end-to-end learned video coding system, in accordance with an example embodiment.

Option 2 is illustrated in FIG. 10, and it includes of a different type of codec architecture. Referring to FIG. 10, it illustrates an example neural network-based end-to-end learned video coding system, in accordance with an example embodiment. As shown FIG. 10, a neural network-based end-to-end learned video coding system 1000 includes an encoder 1001, a quantizer 1002, a probability model 1003, an entropy codec 1004, for example, an arithmetic encoder 1005 and an arithmetic decoder 1006, a dequantizer 1007, and a decoder 1008. The encoder 1001 and the decoder 1008 are typically two neural networks, or mainly comprise neural network components. The probability model 1003 may also mainly comprise neural network components. The quantizer 1002, the dequantizer 1007, and the entropy codec 1004 are typically not based on neural network components, but they may also potentially comprise neural network components. In some embodiments, the encoder, quantizer, probability model, entropy codec, arithmetic encoder, arithmetic decoder, dequantizer, and decoder, may also be referred to as an encoder component, quantizer component, probability model component, entropy codec component, arithmetic encoder component, arithmetic decoder component, dequantizer component, and decoder component respectively.

On the encoding side, the encoder 1001 takes a video/image as an input 1009 and converts the video/image in original signal space into a latent representation that may comprise a more compressible representation of the input. The latent representation may be normally a 3-dimensional tensor for image compression, where 2 dimensions represent spatial information, and the third dimension contains information at that specific location.

Consider an example, in which the input data is an image, when the input image is a 128×128×3 RGB image (with horizontal size of 128 pixels, vertical size of 128 pixels, and 3 channels for the Red, Green, Blue color components), and when the encoder downsamples the input tensor by 2 and expands the channel dimension to 32 channels, then the latent representation is a tensor of dimensions (or 'shape') 64×64×32 (e.g., with horizontal size of 64 elements, vertical size of 64 elements, and 32 channels). Please note that the order of the different dimensions may differ depending on the convention which is used. In some embodiments, for the input image, the channel dimension may be the first dimension, so for the above example, the shape of the input tensor may be represented as 3×128×128, instead of 128×128×3.

In the case of an input video (instead of just an input image), another dimension in the input tensor may be used to represent temporal information.

The quantizer 1002 quantizes the latent representation into discrete values given a predefined set of quantization levels. The probability model 1003 and the arithmetic encoder 1005 work together to perform lossless compression for the quantized latent representation and generate bitstreams to be sent to the decoder side. Given a symbol to be encoded to the bitstream, the probability model 1003 estimates the probability distribution of all possible values for that symbol based on a context that is constructed from available information at the current encoding/decoding state, such as the data that has already encoded/decoded. The arithmetic encoder 1005 encodes the input symbols to bitstream using the estimated probability distributions.

On the decoding side, opposite operations are performed. The arithmetic decoder 1006 and the probability model 1003 first decode symbols from the bitstream to recover the quantized latent representation. Then, the dequantizer 1007 reconstructs the latent representation in continuous values and pass it to the decoder 1008 to recover the input video/image. The recovered input video/image is provided as an output 1010. Note that the probability model 1003, in this system 1000, is shared between the arithmetic encoder 1005 and the arithmetic decoder 1006. In practice, this means that a copy of the probability model 1003 is used at the arithmetic encoder 1005 side, and another exact copy is used at the arithmetic decoder 1006 side.

In this system 1000, the encoder 1001, the probability model 1003, and the decoder 1008 are normally based on deep neural networks. The system 1000 is trained in an end-to-end manner by minimizing the following rate-distortion loss function, which may be referred to simply as training loss, or loss:

$$L = D + \lambda R \qquad \text{equation 2}$$

In equation 2, D is the distortion loss term, R is the rate loss term, and $\lambda$ is the weight that controls the balance between the two losses.

The distortion loss term may be referred to also as reconstruction loss. It encourages the system to decode data that is similar to the input data, according to some similarity metric. Examples of reconstruction losses are:
 a loss derived from mean squared error (MSE);
 a loss derived from multi-scale structural similarity (MS-SSIM), such as 1 minus MS-SSIM, or 1−MS-SSIM;
 losses derived from the use of a pretrained neural network. For example, error(f1, f2), where f1 and f2 are the features extracted by a pretrained neural network for the input (uncompressed) data and the decoded (reconstructed) data, respectively, and error( ) is an error or distance function, such as L1 norm or L2 norm; and
 losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

Multiple distortion losses may be used and integrated into D.

Minimizing the rate loss encourages the system to compress the quantized latent representation so that the quantized latent representation can be represented by a smaller number of bits. The rate loss may be computed on the output of the encoder NN, or on the output of the quantization operation, or on the output of the probability model. In an example embodiment, the rate loss may comprise multiple rate losses. Example of rate losses are the following:
 a differentiable estimate of the entropy of the quantized latent representation, which indicates the number of bits necessary to represent the encoded symbols, for example, bits-per-pixel (bpp);
 a sparsification loss, for example, a loss that encourages the output of the Encoder NN or the output of the quantization to have many zeros. Examples are L0 norm, L1 norm, L1 norm divided by L2 norm; and
 a cross-entropy loss applied to the output of a probability model, where the probability model may be a NN used to estimate the probability of the next symbol to be encoded by the arithmetic encoder 1005.

A similar training loss may be used for training the systems illustrated in FIG. 8 and FIG. 9.

For training one or more neural networks that are part of a codec, such as one or more neural networks in FIG. 8, FIG. 9 and/or FIG. 10, one or more of reconstruction losses may be used, and one or more of the rate losses may be used. All the loss terms may then be combined for example as a weighted sum to obtain the training objective function. Typically, the different loss terms are weighted using different weights, and these weights determine how the final system performs in terms of rate-distortion loss. For example, when more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

In an example embodiment, the rate loss and the reconstruction loss may be minimized jointly at each iteration. In another example embodiment, the rate loss and the reconstruction loss may be minimized alternately, e.g., in one iteration the rate loss is minimized and in the next iteration the reconstruction loss is minimized, and so on. In yet another example embodiment, the rate loss and the reconstruction loss may be minimized sequentially, e.g., first one of the two losses is minimized for a certain number of iterations, and then the other loss is minimized for another number of iterations. These different ways of minimizing rate loss and reconstruction loss may also be combined.

It is to be understood that even in end-to-end learned approaches, there may be components which are not learned from data, such as an arithmetic codec.

For lossless video/image compression, the system 1000 contains the probability model 1003, the arithmetic encoder 1005, and the arithmetic decoder 1006. The system loss function contains the rate loss, since the distortion loss is always zero, in other words, no loss of information.

Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze or process data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which may be different from a quality metric for human perceptual quality. Also, dedicated algorithms for compressing and decompressing data for machine consumption may be different than those for compressing and decompressing data for human consumption. The set of tools and concepts for compressing and decompressing data for machine consumption is referred to here as Video Coding for Machines.

The receiver or decoder-side device may have multiple 'machines' or neural networks (NNs) for analyzing or processing decoded data. These multiple machines may be used in a certain combination which is for example determined by an orchestrator sub-system. The multiple machines may be used for example in temporal succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of objects in the frames.

An 'encoder-side device' may encode input data, such as a video, into a bitstream which represents compressed data. The bitstream is provided to a 'decoder-side device'. The term 'receiver-side' or 'decoder-side' refers to a physical or abstract entity or device which performs decoding of compressed data, and the decoded data may be input to one or more machines, circuits or algorithms. The one or more machines may not be part of the decoder. The one or more machines may be run by the same device running the decoder or by another device which receives the decoded data from the device running the decoder. Different machines may be run by different devices.

The encoded video data may be stored into a memory device, for example, as a file. The stored file may later be provided to another device.

Alternatively, the encoded video data may be streamed from one device to another.

In various embodiments, machine and neural network may be used interchangeably, and may mean any process or algorithm (e.g., learned from data or not) which analyzes or processes data for a certain task. Further, the term 'receiver-side' or 'decoder-side' refers to a physical or abstract entity or device which contains one or more machines, and runs these one or more machines on some encoded and eventually decoded video representation which is encoded by another physical or abstract entity or device, e.g., 'encoder-side device'. In some embodiments, the encoder-side and decoder-side may be present in the same physical or abstract entity or device.

Figure 11:
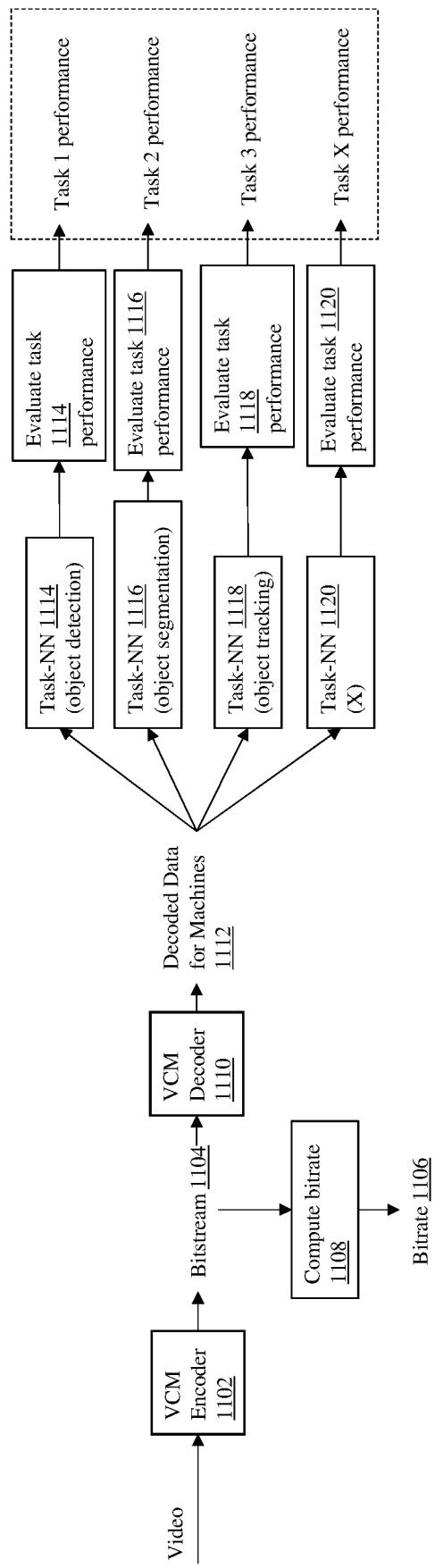
FIG. 11 illustrates a pipeline of video coding for machines (VCM), in accordance with an embodiment.

FIG. 11 illustrates a pipeline of video coding for machines (VCM), in accordance with an embodiment. A VCM encoder 1102 encodes the input video into a bitstream 1104. A bitrate 1106 may be computed 1108 from the bitstream 1104 in order to evaluate the size of the bitstream 1104. A VCM decoder 1110 decodes the bitstream 1104 output by the VCM encoder 1102. An output of the VCM decoder 1110 may be referred, for example, as decoded data for machines 1112. This data may be considered as the decoded or reconstructed video. However, in some implementations of the pipeline of VCM, the decoded data for machines 1112 may not have same or similar characteristics as the original video which was input to the VCM encoder 1102. For example, this data may not be easily understandable by a human, if the human watches the decoded video from a suitable output device such as a display. The output of the VCM decoder 1110 is then input to one or more task neural network (task-NN). For the sake of illustration, FIG. 11 is shown to include three example task-NNs, a task-NN 1114 for object detection, a task-NN 1116 for image segmentation, a task-NN 1118 for object tracking, and a non-specified one, a task-NN 1120 for performing task X. The goal of VCM is to obtain a low bitrate while guaranteeing that the task-NNs still perform well in terms of the evaluation metric associated with each task.

Figure 12:
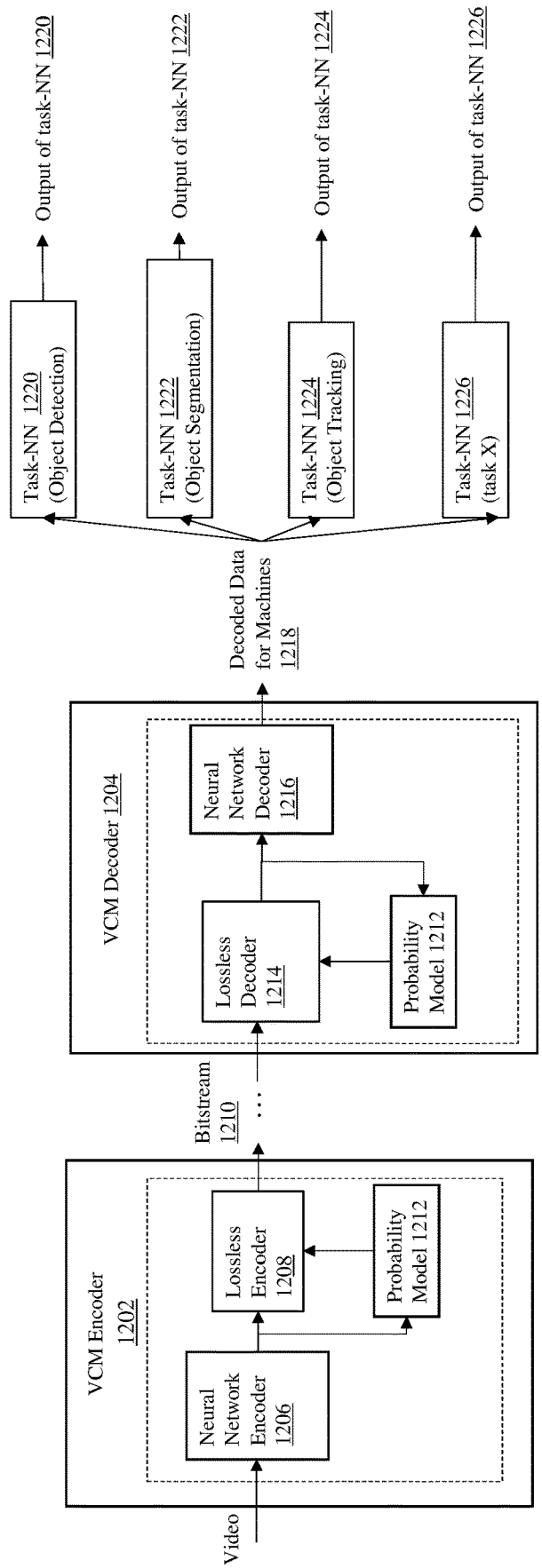
FIG. 12 illustrates an example of an end-to-end learned approach for the use case of video coding for machines, in accordance with an embodiment.

One of the possible approaches to realize video coding for machines is an end-to-end learned approach. FIG. 12 illustrates an example of an end-to-end learned approach, in accordance with an embodiment. In this approach, a VCM encoder 1202 and a VCM decoder 1204 mainly consist of neural networks. The video is input to a neural network encoder 1206. The output of the neural network encoder 1206 is input to a lossless encoder 1208, such as an arithmetic encoder, which outputs a bitstream 1210. The lossless codec may take an additional input from a probability model 1212, both in the lossless encoder 1208 and in a lossless decoder 1214, which predicts the probability of the next symbol to be encoded and decoded. The probability model 1212 may also be learned, for example it may be a neural network. At a decoder-side, the bitstream 1210 is input to the lossless decoder 1214, such as an arithmetic decoder, whose output is input to a neural network decoder 1216. The output of the neural network decoder 1216 is a decoded data for machines 1218, that may be input to one or more task-NNs, a task-NN 1220 for object detection, a task-NN 1222 for object segmentation, a task-NN 1224 for object tracking, and a non-specified one, a task-NN 1226 for performing task X.

Figure 13:
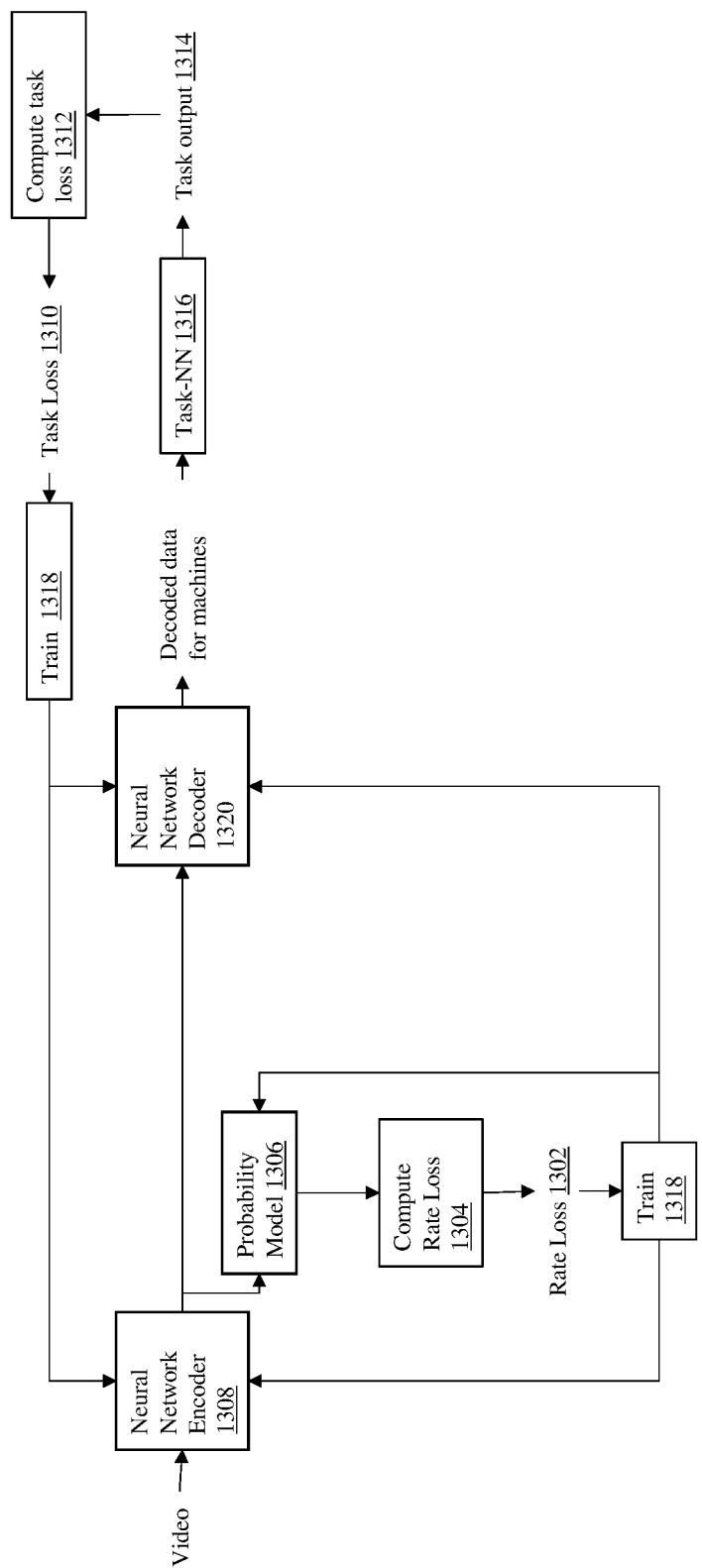
FIG. 13 illustrates an example of how the end-to-end learned system may be trained for the use case of video coding for machines, in accordance with an embodiment.

FIG. 13 illustrates an example of how the end-to-end learned system may be trained, in accordance with an embodiment. For the sake of simplicity, only one task-NN is illustrated. However, it may be understood that multiple task-NNs may be similarly used in the training process. A rate loss 1302 may be computed 1304 from the output of a probability model 1306. The rate loss 1302 provides an approximation of the bitrate required to encode the input video data, for example, by a neural network encoder 1308. A task loss 1310 may be computed 1312 from a task output 1314 of a task-NN 1316.

The rate loss 1302 and the task loss 1310 may then be used to train 1318 the neural networks used in the system, such as the neural network encoder 1308, probability model, a neural network decoder 1320. Training may be performed by first computing gradients of each loss with respect to the trainable parameters of the neural networks that are contributing or affecting the computation of that loss. The gradients are then used by an optimization method, such as Adam, for updating the trainable parameters of the neural networks. It is to be understood that, in alternative or in addition to one or more task losses and/or one or more rate losses, the training process may use additional losses which may not be directly related to one or more specific tasks, such as losses derived from pixel-wise distortion metrics (for example, MSE, MS-SSIM).

The machine tasks may be performed at decoder side (instead of at encoder side) for multiple reasons, for example, the encoder-side device may not have the capabilities (e.g. computational, power, or memory) for running the neural networks that perform these tasks, or some aspects or the performance of the task neural networks may have changed or improved by the time that the decoder-side device needs the tasks results (e.g., different or additional semantic classes, better neural network architecture). Also, there may be a need for customization, where different clients may run different neural networks for performing these machine learning tasks.

Neural Network Based Filtering

In some video codecs, a neural network may be used as filter in the decoding loop, and it may be referred to as neural network loop filter, or neural network in-loop filter. The NN loop filter may replace other loop filters of an existing video codec or may represent an additional loop filter with respect to the already present loop filters in an existing video codec.

In the context of image and video enhancement, a neural network may be used as post-processing filter, for example, applied to the output of an image or video decoder in order to remove or reduce coding artifacts.

In designs of NN filters, the inference may be performed block-wise. The block size may vary within a frame, but a common approach is to use a fixed block size.

It is also common to add padding pixels to sides of a block, e.g., on the left, top, right and bottom sides of the block. A similar padding is also performed when a NN filter processes a whole frame. The padding may be needed by convolutional layers comprised in the NN filter.

In order to reduce the effect of padding onto the output of the NN filter, the input to the NN filter may comprise the pixels to be filtered and additional margins, where the additional margins comprise pixels of the image to be filtered. These additional margins may be referred to as extra pixels; a block with additional margins may be referred to as an extended block. The output of the NN filter may be the same size as the total input size (block size+margin size), therefore a cropping operation may be performed on the output of the NN filter in order to obtain a final output of size equal to the block size.

An example in which:
block size is 128×128;
size of the margin is 8 for each side of the block;
Accordingly, size of the input to the NN filter is (128+(2*8))×(128+(2*8))=144×144.
size of the output of last layer of the NN filter is also 144×144.
After cropping 8 pixels on each side of the output of the last layer of the filter, the final output size is 128×128.

Filtering an image or frames in a block-wise manner is likely to introduce blocking artifacts, especially for those cases where some blocks are filtered and some others are not filtered, or for those cases where different filters are used to filter different blocks.

In various embodiments, filtered margins are blended or combined with overlapping pixels of nearby blocks.

In an embodiment, two overlapping regions are blended by weighted sum based on two or more weights, In an embodiment, the two or more weights are predetermined.

In an embodiment, the predetermined two or more weights may linearly change according to the position of pixels they are associated with.

In an embodiment, the predetermined two or more weights may be fixed and thus may not change according to the position of the pixels they are associated with.

In an embodiment, the at least one of the predetermined two or more weights may be determined based at least on a performance of a NN filter.

In an embodiment, the two or more weights are not predetermined.

In an embodiment, the two or more weights are determined by an encoder. The determined two or more weights, or indications of the two or more weights, may be signaled from an encoder to a decoder.

In an embodiment, the two or more weights are determined at decoder side, based on, but not limited to, one or more of the following:
Data of an input block;
Data of an input extended block;
Data of a margin comprised in an input extended block;
Data of a filtered block;
Data of a filtered extended block; or
Data of a filtered margin comprised in a filtered extended block.

In an embodiment, an encoder may determine the optimal mode for weighting the overlapping pixels out of two or more candidate modes. The determined optimal mode, or an indication thereof, may be signaled from encoder to decoder.

In an embodiment, a margin of a filtered block may be discarded to allow for parallel processing.

In an embodiment, an output size of the filter is determined adaptively according to the position of the block being filtered within the image or frame.

In an embodiment, the weight associated to a pixel may be proportional (linearly or non-linearly) to its distance from (or to its position relative to) a transform or motion block boundary.

In an embodiment, the NN filter receives extra input information about the position of the input block to be filtered relative to a transform or motion block boundary.

More details and additional embodiments are described in following sections.

Preliminary Information about Codecs

In at least some of the embodiments, case of compressing and decompressing data by using a codec is considered. For the sake of simplicity, in at least some of the embodiments, video is considered a data type. However, the proposed embodiments can be extended to other types of data such as images, audio, and the like.

An encoder-side device performs a compression or encoding operation of an input video by using a video encoder. The output of the video encoder is a bitstream representing the compressed video. A decoder-side device performs decompression or decoding operation of the compressed video by using a video decoder. The output of the video decoder may be referred to as decoded video. The decoded video may be post-processed by one or more post-processing operations, such as a post-processing filter. The output of the one or more post-processing operations may be referred to as post-processed video.

The encoder-side device may also include at least some decoding operations, for example, in a coding loop, and/or at least some post-processing operations. In an example, the encoder may include all the decoding operations and any post-processing operations.

The encoder-side device and the decoder-side device may be the same physical device, or different physical devices.

The decoder or the decoder-side device may include one or more neural networks. Some examples of such neural networks are the following:
- A post-processing NN filter (also referred to here as post-filter, or NN post-filter, or post-filter NN), which takes as input at least one of the outputs of an end-to-end learned decoder or of a conventional decoder (e.g., a decoder not comprising neural networks or other components learned from data) or of a hybrid decoder (e.g., a decoder comprising one or more neural networks or other components learned from data).
- A NN in-loop filter (also referred to here as in-loop NN filter, or NN loop filter, or loop NN filter), used within an end-to-end learned decoder, or within a hybrid decoder.
- A learned probability model (e.g., a NN) that is used for providing estimates of probabilities of symbols to be encoded and/or decoded by a lossless coding module, within an end-to-end learned codec or within a hybrid codec.
- A decoder neural network for an end-to-end learned codec.

Various Embodiments

Although the embodiments described herein refer to a NN filter, at least some of these embodiments are applicable to any filter, e.g., also to a filter which is not based on neural networks or other machine learning techniques.

A NN post-processing filter is considered as an example in various embodiments, which may be referred to simply as NN filter or filter. However, at least some of the embodiments may be applied to other types of filters, such as an in-loop filter.

An input to the NN filter is at least a block or patch derived from an image or video frame that is to be filtered, and eventually one or more margins, where the image or video frame may have been decoded by a decoder. Such a block and a margin are referred to as an input block and input margin, respectively. The combination of a block and one or more margins are referred to as an extended block, and the combination of an input block and one or more input margins are referred to as an extended input block. For simplicity, input blocks of square shape are considered as example in various embodiments; however, it is to be understood that input blocks may have different shapes, such as rectangular.

A margin associated to a block may comprise pixels that are near the pixels comprised in that block. In one example, a margin may comprise one or more pixels on the right-hand side of the block. In another example, a margin may comprise one or more pixels on the bottom side of the block.

When the input to the NN filter comprises an extended input block, the output of the NN filter comprises a filtered extended block that, in turn, comprises a filtered block and a filtered margin. It is assumed that the output of the NN filter has same size as the input to the NN filter, except for any padding pixels that may be added to the input.

When filtering an image, one or more extended blocks may be input to a NN filter. A filtered extended block may be combined or blended with one or more other extended blocks or with one or more other blocks. The operation of combining or blending may be used interchangeably. The blending operation is applied to two or more overlapping pixels, where at least one pixel in the two or more overlapping pixels is comprised within a filtered margin of a filtered extended block.

A pixel is considered to overlap with another pixel when their position within the image or frame is same or substantially the same.

Figure 14:
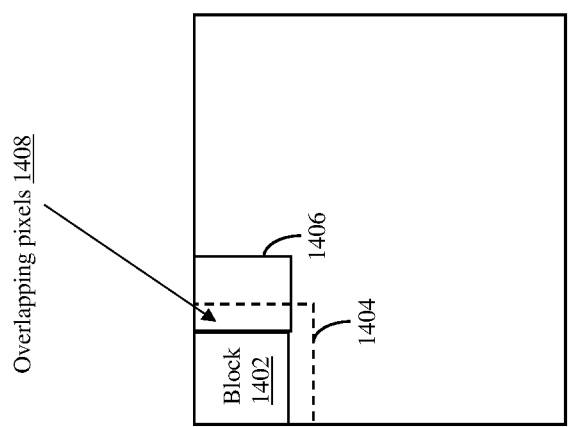
FIG. 14 illustrates an example, in which an image comprises a first extended block and a second block, where at least one pixel of the first extended block and at least one pixel of the second block overlap.

FIG. 14 illustrates an example, in which an image comprises a first extended block and a second block, where at least one pixel of the first extended block and at least one pixel of the second block overlap. The first extended block is input to the NN filter, the NN filter processes the first extended block to obtain a filtered extended block. The filtered extended block is then combined or blended with the second block, where the second block may have not been filtered. The blending operation may be applied to a first set of pixels comprised in the filtered margin of the filtered extended block and to a second set of pixels comprised in the second block, where the pixels in the first set and the pixels in the second set overlap.

In FIG. 14 block 1402 is a filtered block comprised in a filtered extended block; the filtered extended block 1404 comprises a filtered margin; block 1406 is another block which is not input to a NN filter. Some of the pixels comprised in the filtered margin overlap with some of the pixels (overlapping pixels 1408) of block 1406.

Figure 15:
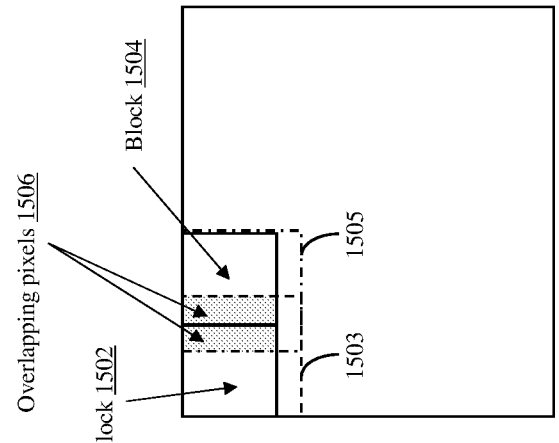
FIG. 15 illustrates another example, in which an image comprises a first extended block and a second extended block, where at least one pixel of the first extended block and at least one pixel of the second extended block overlap.

FIG. 15 illustrates another example, in which an image comprises a first extended block and a second extended block, where at least one pixel of the first extended block and at least one pixel of the second extended block overlap. The first extended block is input to a first NN filter, obtaining a first filtered extended block. The second extended block is input to a second NN filter, obtaining a second filtered extended block. The first and second NN filters may be the same or substantially the same NN filter, or different NN filters. The first filtered extended block is then combined or blended with the second filtered extended block. The blending operation may be applied to a first set of pixels comprised in the filtered margin of the first filtered extended block and to a second set of pixels comprised in the filtered block of the second filtered extended block, where the pixels in the first set and the pixels in the second set overlap. Also, the blending operation may be applied to a first set of pixels comprised in the filtered block of the first filtered extended block and to a second set of pixels comprised in the filtered margins of the second filtered extended block, where the pixels in the first set and the pixels in the second set overlap.

In FIG. 15 block 1502 is a first filtered block comprised in a first filtered extended block 1503, block 1504 is a second filtered block comprised in a second filtered extended block 1505, gray area represents the overlapping pixels 1506 that are blended.

Figure 16:
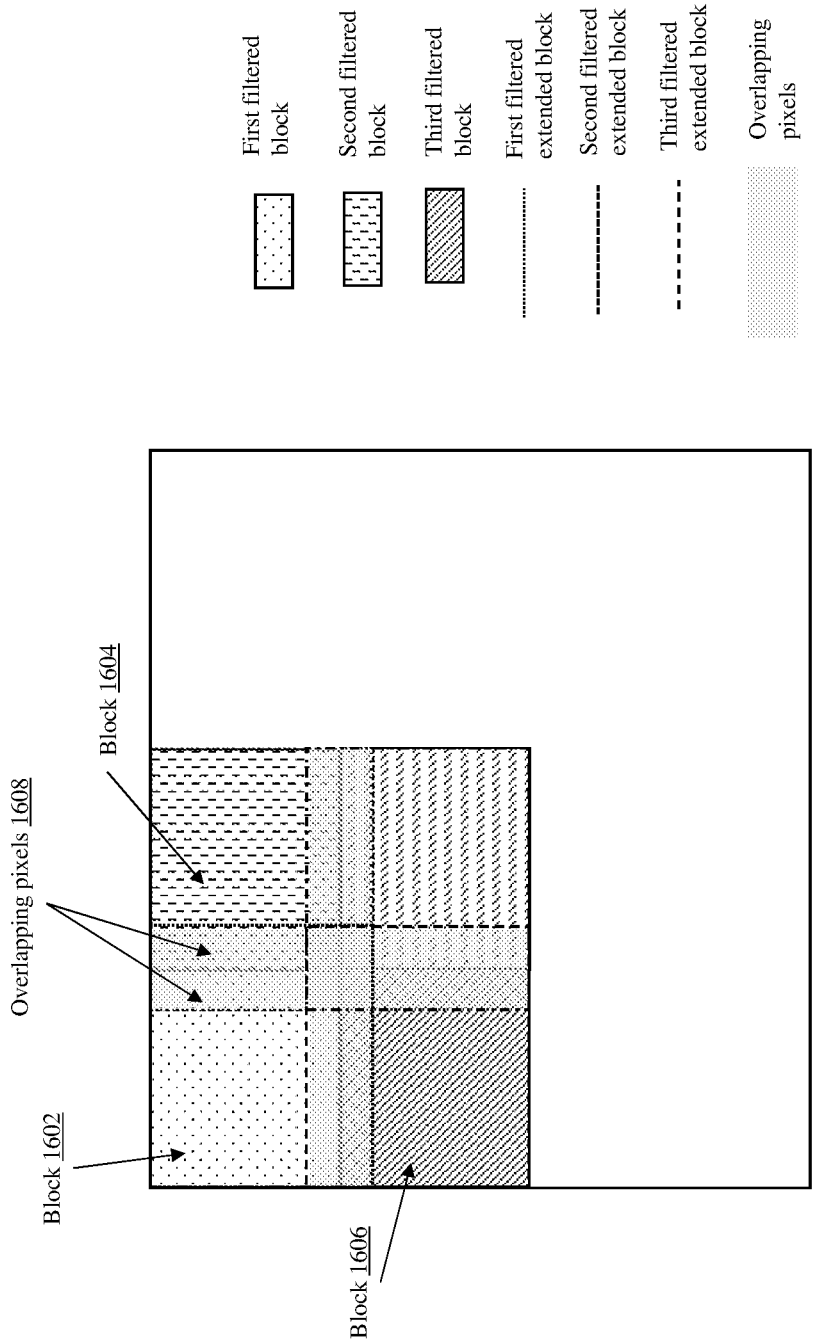
FIG. 16 illustrates yet another example, in which an image comprises a first extended block, a second extended block, and a third extended block, where at least one pixel of the first extended block and at least one pixel of the second extended block overlap and one at least one pixel of the third extended block overlap.

FIG. 16 illustrates yet another example, in which an image comprises a first extended block, a second extended block, and a third extended block, where at least one pixel of the first extended block and at least one pixel of the second extended block overlap and one at least one pixel of the third extended block overlap. The first extended block is input to a first NN filter, obtaining a first filtered extended block. The second extended block is input to a second NN filter, obtaining a second filtered extended block. The third extended block is input to a third NN filter, obtaining a third filtered extended block. The first, second and third NN filters may be the same or substantially the same NN filter, or different NN filters. The first filtered extended block, the second filtered extended block, and the third filtered extended block are then combined or blended. The blending operation may be applied to a first set of pixels comprised in the filtered margin of the first filtered extended block, to a second set of pixels comprised in the filtered block of the second filtered extended block, and/or to a third set of pixels comprised in the filtered block of the third filtered extended block, where the pixels in the first set and the pixels in the second set, or the pixels in the first set and the pixels in the third set overlap. The blending operation may be applied to a first set of pixels comprised in the filtered block of the first filtered extended block, to a second set of pixels comprised in the filtered margin of the second filtered extended block, and/or to a third set of pixels comprised in the filtered margin of the third filtered extended block, where the pixels in the first set and the pixels in the second set, or the pixels in the first set and the pixels in the third set overlap. The blending operation may be applied to a first set of pixels comprised in the filtered margin of the first filtered extended block, to a second set of pixels comprised in the filtered margin of the second filtered extended block, and/or to a third set of pixels comprised in the filtered margin of the third filtered extended block, where the pixels in the first set and the pixels in the second set, and/or the pixels in the first set and the pixels in the third set overlap.

In FIG. 16 block 1602 represents a first filtered block comprised in a first filtered extended block, block 1604 represents a second filtered block comprised in a second filtered extended block, block 1606 represents a third filtered block comprised in a third filtered extended block, the gray area 1608 represents the overlapping pixels that are blended.

In an embodiment, two or more overlapping pixels are blended by a weighted sum based on two or more weights. Two overlapping pixels x1[i,j] and x2[i,j] at position (i, j) are blended as follows:

$$y[i,j]=w1[i,j]*x1[i,j]+w2[i,j]*x2[i,j]$$

where w1[i,j] and w2[i,j] are two weights applied to x1[i,j] and x2[i,j], respectively, and y[i,j] is the resulting blended pixel.

Fixed Predetermined Weights

In one embodiment, the predetermined two or more weights may be fixed and thus may not change according to the position of the pixels they are associated to. In one example, two overlapping pixels may be weighted according to two weights equal to, e.g., 0.5 and 0.5, independently of the position of the two overlapping pixels.

Predetermined Weights Based on Performance of NN Filter

In one embodiment, the at least one of the predetermined two or more weights may be determined based at least on a performance of a NN filter. The performance may be measured based at least on, but not limited to, one or more of the following:
 a training dataset, a validation dataset; or
 a performance metric (e.g., PSNR).

In one example, a first NN filter is used to filter a first extended block, a second NN filter is used to filter a second extended block, where a first set of pixels in the first extended block overlap with a second set of pixels in the second extended block; the weight used for weighting the first set of pixels is determined based at least on the performance of the first NN filter; the weight used for weighting the second set of pixels is determined based at least on the performance of the second NN filter. In another example, each of the weights used for weighting the first set of pixels and the second set of pixels is determined based at least on the performance of the first NN filter and on the performance of the second NN filter. Thus, when the first NN filter performs better than the second NN filter on a validation dataset, the weight used for weighting the first set of pixels is determined to be higher than the weight used for weighting the second set of pixels.

Non-Predetermined Weights

In an embodiment, the two or more weights are not predetermined.

Non-Predetermined Weights Determined and Signaled by Encoder

In an embodiment, the two or more weights are determined by an encoder. The encoder may determine the two or more weights based on an optimization process, for example, by rate-distortion optimization (RDO). The two or more weights may be determined for a certain set of overlapping pixels, where such a set may be comprised within:
 An overlapping region. Thus, different sets of the two or more weights may be determined for different overlapping regions.
 Two or more overlapping regions. Thus, the same set of two or more weights may be determined for different overlapping regions.
 All overlapping regions in a frame. Thus, the same set of two or more weights may be determined for all the overlapping regions in a frame.
 Two or more frames, e.g., for all frames in a random access (RA) segment.

In an embodiment, the encoder may determine the two or more weights to be associated to respective two or more NN filters. In an example, three NN filters are considered, the encoder determines three weights which are associated to three respective NN filters. At decoder side, one or more of the three weights may be normalized so that the sum of two or more of the three weights is equal to 1. Then, the normalized one or more weights are used in the blending operation.

The determined two or more weights, or indications of the two or more weights, may be signaled from an encoder to a decoder, in or along the bitstream. The encoder may also signal information about whether a certain weight shall be applied to a pixel comprised in a filtered margin or whether a certain weight shall be applied to a pixel comprised in a filtered block.

In an embodiment, the encoder may signal an indication of the weights to be used for the blending operation, such as one or more indexes of a look-up table. The corresponding weights may then be retrieved from the look-up table by indexing the look-up table based on the signaled indexes. In one example, three sets of two or more weights are available at decoder side, where each of the three sets is associated to an index and can be retrieved from a look-up table based at least on the index; an encoder determines an optimal set of two or more weights out of the three sets; the encoder signals to the decoder information about the determined optimal set, such as an indication of the index.

Non-Predetermined Weights Determined at Decoder Side Based on Data

In an embodiment, the two or more weights may be determined at decoder side, based at least on, but not limited to, one or more of the following:
 Data of an input block;
 Data of an input extended block;
 Data of a margin comprised in an input extended block;
 Data of a filtered block;
 Data of a filtered extended block;
 Data of a filtered margin comprised in a filtered extended block; or An estimate of uncertainty (or confidence) of an NN filter with respect to data of the filtered block and/or the filtered margin.

In an embodiment, the determination may be performed by one or more NN layers, where the input to the one or more NN layers may comprise, but not be limited to, one or more of the above data, and the output from the one or more NN layers may comprise the determined two or more weights.

Figure 17:
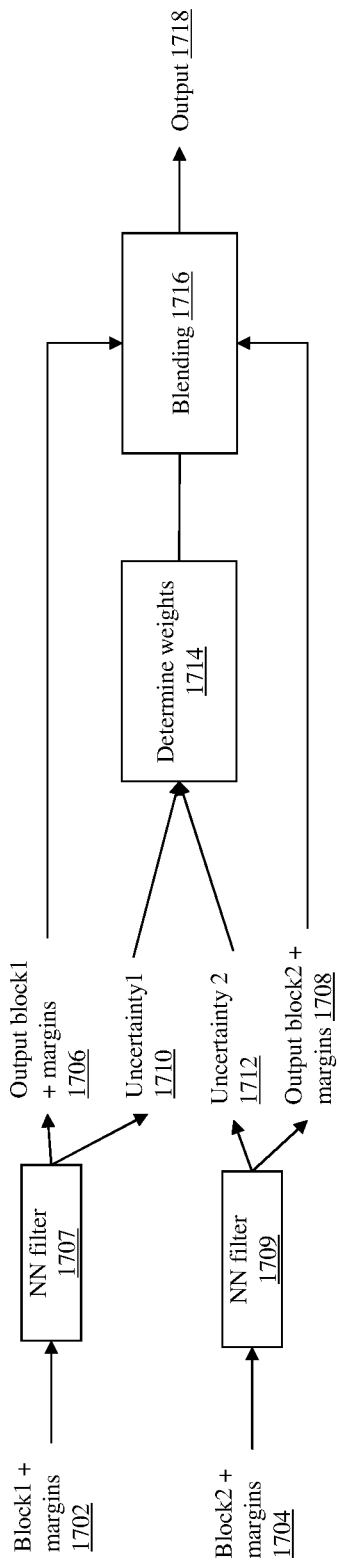
FIG. 17 illustrates an embodiment, an uncertainty (or confidence) estimate may be comprised in an output of a NN filter, in accordance with an embodiment.

FIG. 17 illustrates an embodiment, an uncertainty (or confidence) estimate may be comprised in an output of a NN filter, in accordance with an embodiment. For example, the NN filter may output a filtered extended block and an estimate of uncertainty associated to that filtered extended block. The estimate of uncertainty may represent an estimate of the performance of the NN filter for the filtered extended block or for part of the filtered extended block.

Such a filter may be trained based at least on a loss, where the loss may be a distortion function (e.g., MSE) computed based on the estimated uncertainty and the error made by the NN filter. The error may be the MSE between the filtered block (or the filtered margin, or the filtered extended block) and the respective ground-truth data. In one example, multiple uncertainty estimates are output by the NN filter, where a first estimate is associated to the filtered margin, a second estimate is associated to the filtered block, and a third estimate is associated to the filtered extended block.

In FIG. 17 block1+margins 1702 represents a first input extended block, block2+margins 1704 represents a second input extended block, output block1+margins 1706 represents a first filtered extended block filtered by an NN filter 1707, output block2+margins 1708 represents a second filtered extended block filtered by an NN filter 1709, uncertainty1 1710 represents a first estimate of uncertainty associated to the first filtered extended block, uncertainty2 1712 represents a second estimate of uncertainty associated to the second filtered extended block, determine weights 1712 comprises determining a first weight and a second weights based at least on uncertainty1 1708 and uncertainty2 1710, blending 1716 comprises performing a blending operation based at least on the determined first weight, second weight, the first filtered extended block, or the second filtered extended block. The first weight is multiplied by at least some of the pixels in the first filtered extended block that overlap with some of the pixels in the second filtered extended block. The second weight is multiplied by at least some of the pixels in the second filtered extended block that overlap with some of the pixels in the first filtered extended block. The results of these two multiplications are summed. The result of the summation operation is the output 1718 of the blending operation.

Figure 18:
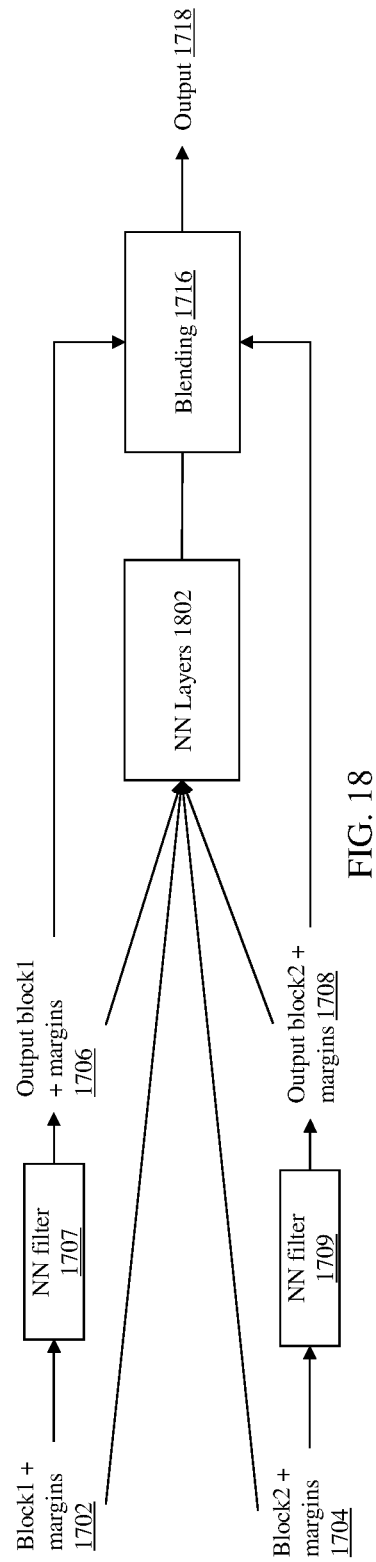
FIG. 18 illustrates another example of the embodiment explained in FIG. 17.

FIG. 18 illustrates another example of the embodiment explained in FIG. 17. In this example, the weights are determined by NN layers 1802, where the NN layers 1802 comprise one or more neural network layers, based at least on a first input extended block, a second input extended block, a first filtered extended block, or a second filtered extended block.

Non-Predetermined Weights—Signaling the Weighting Mode

In one embodiment, an encoder may determine the optimal mode for weighting the overlapping pixels out of two or more candidate modes. Example modes include following, that have been described in the previous embodiments:

Using a first set of predetermined weights, where the first set of predetermined weights linearly change according to the position of the pixels to which they are applied. Also known as linear blending.

Using a second set of predetermined weights, where the second set of predetermined weights linearly change according to the position of the pixels to which they are applied. Also known as linear blending.

Using a first set of predetermined weights, where the first set of predetermined weights do not change according to the position of the pixels to which they are applied.

Using a second set of predetermined weights, where the second set of predetermined weights do not change according to the position of the pixels to which they are applied.

Using a set of weights, where the set of weights or indications about the set of weights may be signaled from encoder to decoder.

Using a set of content-adaptive weights, where the content-adaptive weights may be determined at decoder side based on data.

The determined optimal mode may be signaled from encoder to decoder in or along the bitstream, for example, as part of an SEI message.

Non-Predetermined Weights—Parallel Row Processing

In one embodiment, a margin of a filtered block may be discarded to allow for parallel processing. In one example, the bottom margin of a filtered block may be discarded to allow for parallel row processing, e.g., more than one row of input extended blocks may be processed simultaneously or substantially simultaneously.

In one embodiment, a filtered block has a margin on the right side and below the block, but not on the left side or above the block. In other words, by filtering a block, an extended block is formed, whereby the extended block extends the block on the right side and below. An example is shown in FIG. 14, where a block 1402 filtering extends the block to the right and below to form an extended block 1404. Since the blocks are not extended above or to the left, the blocks can be reconstructed in one pass of a raster scan order, which a typical decoding order of blocks in a video bitstream. To facilitate parallel row processing in encoding and/or decoding, the samples in the margin below the block may be stored in a buffer memory or alike. In one embodiment, the next block row below a current block row can be processed in encoding and/or decoding with one block 'delay' so that the margin samples from the block above are available for reconstructing a block in the next block row. In one embodiment, the buffer memory or alike can store the margin samples for an entire block row so that blocks can be processed in raster scan order.

Non-Predetermined Weights—Adaptive Output Size

In one embodiment, an output size of the filter is determined adaptively according to the position of the block being filtered within the image or frame.

Assuming in-loop NN filter, the output size may be determined according to one or more of the following methods:

When loop filtering across tile, slice, or subpicture boundaries has been configured to be disabled in the encoder or decoded or inferred to be disabled in the decoder, the margins for extended blocks are adapted not to cross tile, slice, or subpicture boundaries, respectively. For example, when the CTU size is 128×128, an encoder and/or decoder may use 128×128 output on CTUs at the tile, slice, or subpicture boundary when loop filtering across tiles, slices, or subpictures (respectively) is disabled. Otherwise, the encoder and/or decoder may use an extended block size of 144×144, for example.

For gradual decoding refresh:
  When the boundary between the clean area and the dirty area is on a CTU row boundary, use a horizontally and vertically extended block size, such as 144×144, output at the boundary CTUs of the clean area (e.g., the clean area may propagate to the dirty area) and a horizontally extended block size, such as 144×128, output at the boundary CTUs of the dirty area.
  When the boundary between the clean area and the dirty area is on a CTU column boundary, use a horizontally and vertically extended block size, such as 144×144, output at the boundary CTUs of the clean area (e.g., the clean area may propagate to the dirty area) and a vertically extended block size, such as 128×144, output at the boundary CTUs of the dirty area.
  Similar tuning may be done at subpicture boundaries between a first subpicture with loop filtering across boundaries disabled and a second subpicture with loop filtering across boundaries enabled.

Non-Predetermined Weights—Filtering Close to Transform/Motion Block Boundaries

In an embodiment, the weight associated to a pixel may be proportional (linearly or non-linearly) to its distance from (or position relative to) a transform or motion block boundary. In an example, the weight applied to a pixel comprised in a filtered extended block may be high when the pixel is close to transform/motion block boundaries, and small when the pixel is further away.

In an embodiment, the NN filter receives extra input information about the position of the input block to be filtered relative to a transform or motion block boundary. Example of such extra input information include, but are not limited to, the following:
  The distance from the (transform/motion) block boundary.
  Information whether the sample is on left or right side of the transform/motion block edge.
  Both the above information may be represented by a channel (matrix) with a negative distance when the closest block edge is on right of the sample and a positive distance when the closest edge is on left of sample, or other way around. A similar channel may be used for the vertical direction.

Embodiment on Training

In one embodiment, a first NN filter may be trained or finetuned based at least on an output of the first filter or a second filter. At a certain training iteration, the input to the first NN filter may be a first input block or a first extended input block, obtaining a first output block. The first output block may be combined or blended with an auxiliary output, where the auxiliary output may comprise one or more pixels of a second output block, where the second output block is output by the first filter or by the second filter when the input to the first filter or to the second filter is a second input block or a second extended input block. The combination may be based on a predetermined algorithm and/or parameters, or may be based on a learned algorithm and/or learned parameters. The output of the combination may represent the final output of the first NN filter, and may be used to compute a value of a loss function based at least on ground-truth information. The loss may be differentiated with respect to one or more parameters of the first NN filter and/or with respect to one or more parameters of the combination, obtaining one or more gradients. The one or more gradients are used to update the one or more parameters of the first NN filter and/or the one or more parameters of the combination.

A decoder or a decoder-side device may have multiple versions of a certain operation. When the operation of a NN post-filter is considered, the decoder or a decoder-side device may comprise multiple post-filters, where the multiple post-filters may be different in one or more aspects, where the one or more aspects may comprise, but not be limited to, one or more of the following:
  Different training data;
  Different input data at inference time. For example, one NN post-filter may get as input only a decoded picture, and another NN post-filter may get as input a decoded picture and information about a quantization parameter (QP) used to code the picture from which the decoded picture is derived;
  Different pre-processing of the input data, where the input data may be the training data or the test data;
  Different architecture of the NN post-filters;
  Different post-processing of the output data; or
  Different algorithm used for performing the inference.
  In one example, five NN post-filters are used, where four are NNs pretrained on one or more big training datasets, and one is an NN overfitted on test data by an encoder.

When the operation of an in-loop NN filter is considered, the decoder may comprise multiple in-loop filters, where the multiple in-loop filters may be different in one or more aspects, where the one or more aspects may comprise, but not be limited to, one or more of the aspects already described above for the post-filter.

In at least some of the embodiments described herein, the example of NN post-filter will be considered, although similar conclusions can be made to other operations (e.g., non-NN post-filter, NN loop filter, non-NN loop filter, and the like).

The decoder may need to determine which version of a certain operation to use for a certain block or frame. For example, given a decoded block to be filtered by a post-filter, the decoder may need to determine which of the available post-filters to utilize, or which configuration of each available post-filter to utilize.

In at least some of the embodiments, the different post-filters available at decoder side, the different versions of a post-filter, and the different configurations of a post-filter, are referred to as filtering modes. Thus, a filtering mode may refer to a specific post-filter out of several available post-filters, and/or to a specific configuration of a post-filter (e.g., using a certain combination of the output of the post-filter with the input to the post-filter).

As the decoder may not have access to ground-truth information, it may not be able to perform the determination of the filtering mode. One solution may comprise having the encoder signaling information to the decoder about the filtering mode to use. However, when there are several/many versions, and/or when the signaling occurs at a sufficiently high granular level (e.g., at CTU level), signaling the information about the filtering modes may require a high bitrate overhead, which would lower the coding gain brought by the filtering operation.

Reducing this bitrate overhead is one of the problems addressed by the following embodiments.

In an embodiment, a decoder or a decoder-side device determines the filtering mode based at least on:
  lowering the quality of an input data unit to obtain a low quality input data unit;

filtering the low quality input data unit based at least on two or more filtering modes, where the two or more filtering modes may be associated with one or more filters;

obtaining two or more filtered data units;

computing two or more accuracies based at least on the two or more filtered data units and the input data unit; and/or determining the filtering mode that provides the highest accuracy.

More details and other embodiments are described following paragraphs.

Additional Embodiments

The input to the NN filter may comprise a block or patch derived from an image or video frame that is to be filtered. Alternatively, the input to the NN filter may comprise an image or a video frame. In at least some of the embodiments, the input to the NN filter may be referred simply as input data unit, independently of whether it comprises a block, a full frame, or a set of frames.

In an embodiment, a decoder or a decoder-side device may determine a filtering mode based at least on one or more of the following:

lowering the quality of an input data, based at least on a quality reduction algorithm, obtaining a low quality data unit;

filtering the low quality data unit based at least on two or more filtering modes, where the two or more filtering modes are associated with one or more filters, to obtain respective two or more filtered data units;

computing two or more accuracies based at least on the input data unit and the respective two or more filtered data units;

comparing the two or more accuracies in order to determine the highest accuracy;

determining the optimal filtering mode to be the filtering mode that provides the highest accuracy; and/or the filter (and filter configuration) that is associated to the optimal filtering mode is used for filtering the input data unit.

In an example, two versions of an NN post-filter may be available at decoder side, where the two versions are associated to two respective filtering modes, and a first version is a pretrained NN filter and a second version is an overfitted NN filter. The input data units may be blocks derived from decoded pictures. In order to lower the quality of the input block, the input block is quantized and dequantized, based on one or more quantization parameters that may be predetermined or may be signaled from encoder to decoder. The low quality block is input to the two versions of NN filter, obtaining respective two filtered blocks. Two PSNR values are computed based on the input block and the respective filtered blocks. The optimal filtering mode is determined to be the filtering mode associated with the version of NN filter that produced the filtered block with higher PSNR.

Figure 19:
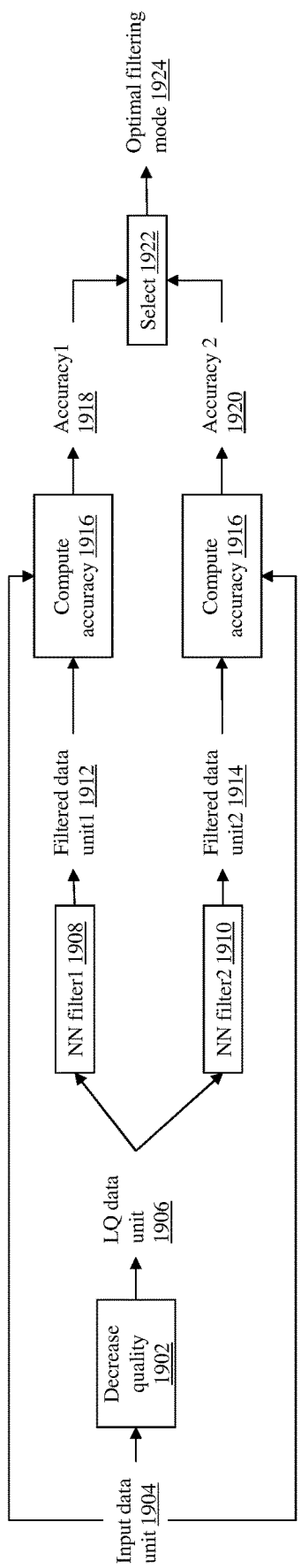
FIG. 19 illustrates an example with two versions of a NN filter available at a decoder side.

FIG. 19 illustrates an example with two versions of a NN filter available at a decoder side. A decrease quality module or circuit 1902 is configured to lower or decrease the quality of an input data unit 1904 to obtain a low quality data unit referred to as LQ data unit 1906. A first NN filter, e.g., NN filter/module or circuit 1908 and a second NN filter, e.g., NN filter2 module or circuit 1910 are configured to filter the LQ data unit 1906 to obtain a first filtered data unit, e.g., filtered data unit1 1912 and a second filtered data unit, e.g., filtered data unit2 1914, respectively. A compute accuracy module or circuit 1916 is configured to compute a first accuracy, e.g., accuracy1, 1918 based at least on the first filtered data unit 1912 and a second accuracy accuracy2 1920 based at least on the second filtered data unit 1914. A select module or circuit 1922 is configured to comparing the first accuracy 1918 and the second accuracy 1920, determine which one is higher, and determine or select the optimal filtering mode 1924 to be the filtering mode associated to the filter whose output comprises a higher accuracy of the two accuracies.

In an embodiment, the method for lowering the quality of an input data unit may comprise, but not be limited to, one or more of the following methods:

Quantization and de-quantization;

Transform (e.g., DCT), quantization, de-quantization, and inverse transform;

Re-encoding and re-decoding (eventually excluding the lossless coding);

Down-sampling and up-sampling; or

Adding noise or artefacts.

For example, the input data unit may be first processed by another NN that outputs a data unit that comprises additional coding artefacts. The NN may be trained to generate typical artefacts caused by conventional codecs, such as ringing and blocking.

In an embodiment, an encoder may determine which method for lowering the quality of an input data unit shall be used by a decoder or by a decoder-side device. Information about the determined method for lowering the quality of an input data unit, such as an indication of the method, may then be signaled by the encoder to a decoder, within or along the bitstream. The encoder may also signal one or more parameters related to the determined method, such as a quantization parameter in the case where the determined method comprises quantization. For example, the encoder may determine that lowering the quality by quantizing and dequantizing the input data unit leads to a more correct determination of the optimal filtering mode, based at least on ground truth information such as an uncompressed data unit. The decoder may use the received information about the method for lowering the quality of an input data unit and use the indicated method for lowering the quality of an input data unit.

The signaled method may be valid (e.g., have scope) for all data units in a video sequence, only for certain frame(s), only for one or more blocks of a frame, or for a random access segment of a video. When the scope is not predetermined, the encoder may signal to the decoder, in or along the bitstream, the scope of the signaled method. For example, the encoder may signal to the decoder an indication that, for a first frame, the method for lowering the quality comprises quantization and dequantization; and an indication that, for a second frame, the method for lowering the quality comprises down-sampling and up-sampling.

In an embodiment, the encoder may perform the same proposed procedure (e.g., determining of the method, and eventually its parameters, for lowering the quality) and may signal to the decoder information on whether to perform the procedure or not, information on whether to perform the procedure at CTU level or at slice level or at frame level, etc.

In an example, the encoder determines (based on the knowledge of the ground-truth (uncompressed data)) that the procedure fails for one or more CTUs, and the drop in PSNR or coding gain is significant. In this example, the encoder may signal to the decoder that, for those one or more CTUs, the procedure shall not be applied and the encoder signals information about which filtering mode shall be used by the decoder or decoder-side device.

In another example, the encoder determines (based on the knowledge of the ground-truth (uncompressed data)) that the procedure fails for most of the CTUs in a frame, and that the drop in PSNR or coding gain is significant. In this embodiment, the encoder may signal to the decoder that, for all CTUs in that frame, the procedure shall not be applied and the encoder signals information about which filtering mode shall be used by the decoder or decoder-side device.

Accuracy (e.g., as described in FIG. 19) may be derived from, for example, PSNR, MAE, or SSE.

In another example, the encoder may signal an identifier of the optimal filtering mode to the decoder. The encoder may compress the identifier using a context adaptive probability model. The identifier of the selected filtering mode by a predefined procedure may be used as the context to compress the identifier of the optimal filtering mode. Probabilities for the context model may be computed from the computed accuracies of NN filters. Alternatively or additionally, probabilities for the context model may be derived or tuned by those of spatially adjacent already reconstructed data units (e.g., blocks) and/or temporally co-located and already reconstructed data units (e.g., co-located blocks of an already reconstructed frame). The optimal filter may be selected with a rate-distortion equation, e.g., also taking the bitrate of the identifier into account.

In an embodiment, a decoder or decoder-side device may 'copy' the optimal filtering mode for a first data unit from the optimal filtering mode that was already determined for a second data unit. Accordingly, the decoder or decoder-side device may not need to perform the determination of the optimal filtering mode for the first data unit. In one example, the first data unit is a block of a video frame; the second data unit may be, but not limited to, one of the following:

A co-located block in a frame that has been already reconstructed;

An already reconstructed frame; or

A reconstructed block in the same frame as the first block. e.g., near the first block.

In an embodiment, the decoder or decoder-side device may determine one or more weights associated to one or more filtering modes, where the one or more weights are used to weight the output of the one or more filters associated to the one or more filtering modes, and the weighted outputs may then be combined (e.g., by a summation). The output of the combination represents the filtered output. The one or more weights may be scalar values or matrices. When a weight matrix does not have the same spatial size as the output of a filter, the weight matrix may be rescaled, for example, by interpolation to the size of the output of the filters.

In order to determine the one or more weights, a similar procedure to what was described in one or more previous embodiments may be used, with the difference that the accuracies associated to the filtering modes are not used for selecting one of the filtering modes but are used for determining the one or more weights. In other words, the one or more weights may be determined based on the computed accuracies. For example, the one or more weights may be determined based on a normalization of the accuracies.

Embodiment on Scalable Coding

In spatial or quality scalable video coding, a base layer (a.k.a. an independent layer or a reference layer) has lower resolution or lower quality than an enhancement layer (a.k.a. a dependent layer or a predicted layer). The enhancement layer is an inter-layer predicted from the base layer.

Figure 20:
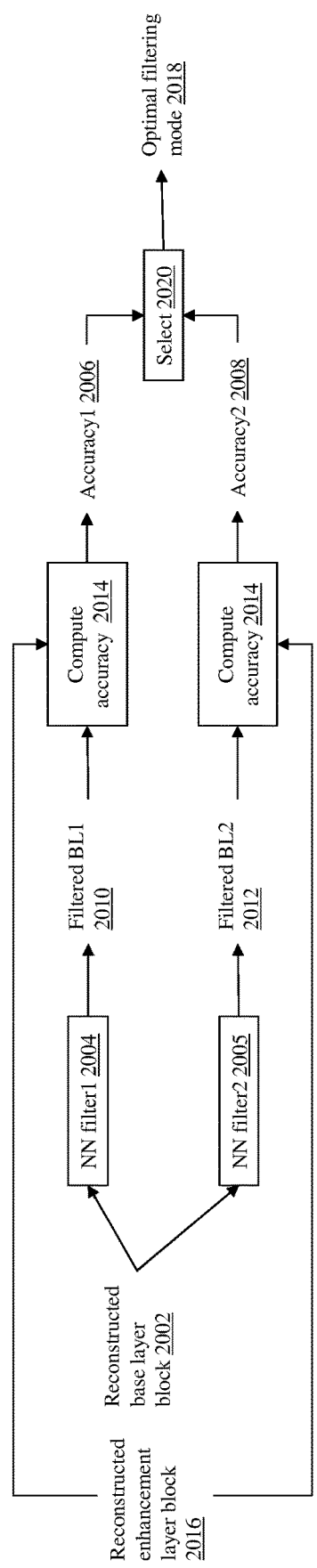
FIG. 20 illustrates an embodiment in which a reconstructed base layer (BL) block is filtered with multiple NN filters or circuits.

FIG. 20 illustrates an embodiment in which a reconstructed base layer (BL) block 2002 is filtered with multiple NN filters or circuits, for example, NN filter1 2004 and NN filter2 2005. An accuracy (for example, an accuracy1 2006 and an accuracy2 2008) of each filtered BL output (for example, a filtered BL1 2010 and a filtered BL2 2012), is computed, by a compute accuracy block or circuit 2014, against the respective reconstructed enhancement layer block 2016. When the spatial resolution and/or other dimension of the filtered BL outputs (e.g., the filtered BL1 2010 and the filtered BL2 2012) are not equal to those of the respective reconstructed enhancement layer blocks 2016 (or anyway not allowing for computing the accuracy correctly), a pre-processing operation may be performed on the filtered BL outputs (e.g., filtered BL 2010 and 2012) and/or the respective reconstructed enhancement layer blocks 2016, followed by computing the accuracy by the compute accuracy block or circuit 2014. The pre-processing operation may comprise, for example, upsampling the filtered BL outputs so that the obtained upsampled filtered BL outputs have same or substantially same resolution as the respective reconstructed enhancement layer blocks 2016. An optimal filtering mode 2018 is determined or selected by select block or circuit 2020 to be the filtering mode associated to an NN filter that produced a filtered BL output with higher accuracy. The determined optimal filtering mode 2018 may then be used for filtering a reconstructed enhancement layer block.

FIG. 21 is an example apparatus 2100, which may be implemented in hardware, caused to implement mechanisms for blending extra output pixels of a filter and/or decoder-side selection of filtering modes, based on the examples described herein. The apparatus 2100 comprises at least one processor 2102, at least one non-transitory memory 2104 including computer program code 2105, wherein the at least one memory 2104 and the computer program code 2105 are configured to, with the at least one processor 2102, cause the apparatus 2100 to implement mechanisms for blending extra output pixels of a filter and/or decoder-side selection of filtering modes 2106, based on the examples described herein. In an embodiment, the at least one neural network or the portion of the at least one neural network may be used at a decoder-side for decoding or reconstructing one or more media items.

The apparatus 2100 optionally includes a display 2108 that may be used to display content during rendering. The apparatus 2100 optionally includes one or more network (NW) interfaces (I/F(s)) 2110. The NW I/F(s) 2110 may be wired and/or wireless and communicate over the Internet/other network(s) via any communication technique. The NW I/F(s) 2110 may comprise one or more transmitters and one or more receivers. The N/W I/F(s) 2110 may comprise standard well-known components such as an amplifier, filter, frequency-converter, (de)modulator, and encoder/decoder circuitry(ies) and one or more antennas.

The apparatus 2100 may be a remote, virtual or cloud apparatus. The apparatus 2100 may be either a coder or a decoder, or both a coder and a decoder. The at least one memory 2104 may be implemented using any suitable data storage technology, such as semiconductor based memory devices, flash memory, magnetic memory devices and systems, optical memory devices and systems, fixed memory and removable memory. The at least one memory 2104 may comprise a database for storing data. The apparatus 2100 need not comprise each of the features mentioned, or may comprise other features as well. The apparatus 2100 may correspond to or be another embodiment of the apparatus 50 shown in FIG. 1 and FIG. 2, any of the apparatuses shown in FIG. 3, or apparatus 700 of FIG. 7. The apparatus 2100 may correspond to or be another embodiment of the apparatuses shown in FIG. 20, including UE 110, RAN node 170, or network element(s) 190.

FIG. 22 illustrates an example method 2200 for blending extra output pixels of a filter, in accordance with an embodiment. As shown in block 2106 of FIG. 21, the apparatus 2100 includes means, such as the processing circuitry 2102 or the like, blending extra output pixels of a filter. At 2202, the method 2200 includes receiving an input extended block. The input extended block may include an input block and one or more input margins, where the input block is derived from an image or a video frame. The input block and the one or more input margins are input to a filter, where the one or more input margins comprise one or more pixels of the image or the video frame. At 2204, the method 2200 includes filtering the input extended block to obtain a filtered extended block. The filtered extended block comprises a filtered block and one or more filtered margins. At 2206, the method 2200 includes receiving one or more other blocks, where the one or more other blocks are derived from the image or video frame, and at least one pixel of the one or more other blocks overlaps with at least one pixel of the filtered margins of the filtered extended block. At 2208, the method 2200 includes blending the filtered extended block with the one or more other blocks, where an operation to blend the filtered extended block with the one or more other blocks is applied to two or more overlapping pixels. A pixel is considered to overlap with another pixel when a position of the pixel and the another pixel, within the image or the video frame, is same or substantially same.

Figure 23:
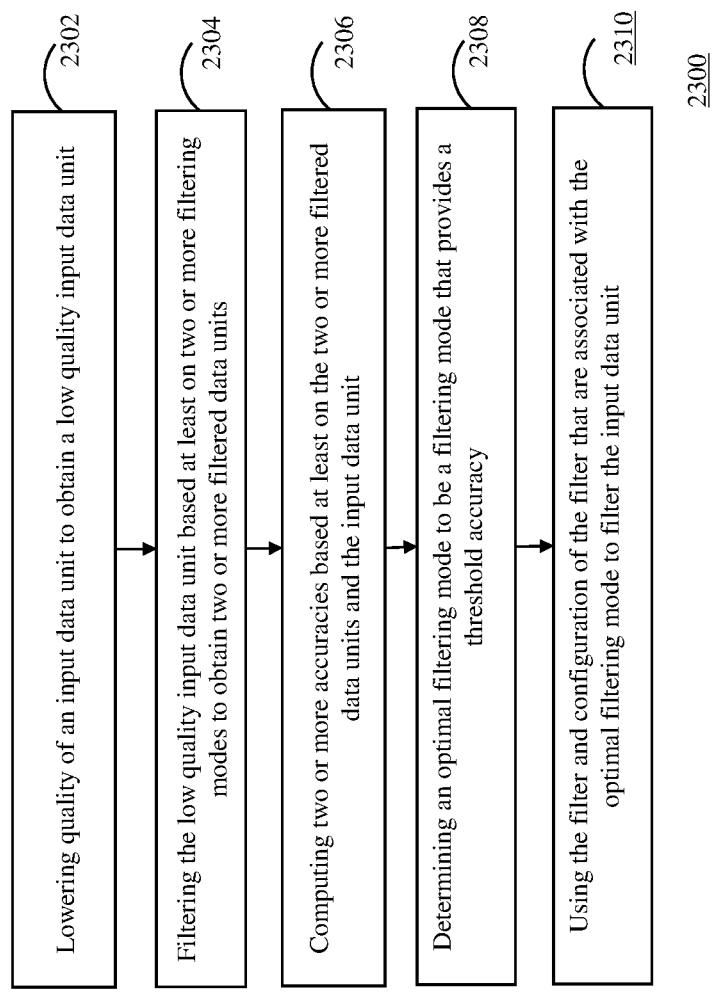
FIG. 23 illustrates an example method for decoder-side selection of filtering modes, in accordance with an embodiment.

FIG. 23 illustrates an example method 2300 for decoder-side selection of filtering modes, in accordance with an embodiment. As shown in block 2106 of FIG. 21, the apparatus 2100 includes means, such as the processing circuitry 2102 or the like, for decoder-side selection of filtering modes. At 2302, the method 2300 includes lowering quality of an input data unit to obtain a low quality input data unit. At 2304, the method 2300 includes filtering the low quality input data unit based at least on two or more filtering modes to obtain two or more filtered data units, where the two or more filtering modes are associated with one or more filters. At 2306, the method 2300 includes computing two or more accuracies based at least on the two or more filtered data units and the input data unit. At 2308, the method 2300 includes determining an optimal filtering mode to be a filtering mode that provides an accuracy that is greater than or equal a threshold accuracy. At 2310, the method includes using the filter and configuration of the filter that are associated with the optimal filtering mode to filter the input data unit. In an embodiment, the threshold accuracy comprises highest accuracy. An example of the filter includes a neural network filter.

Figure 24:
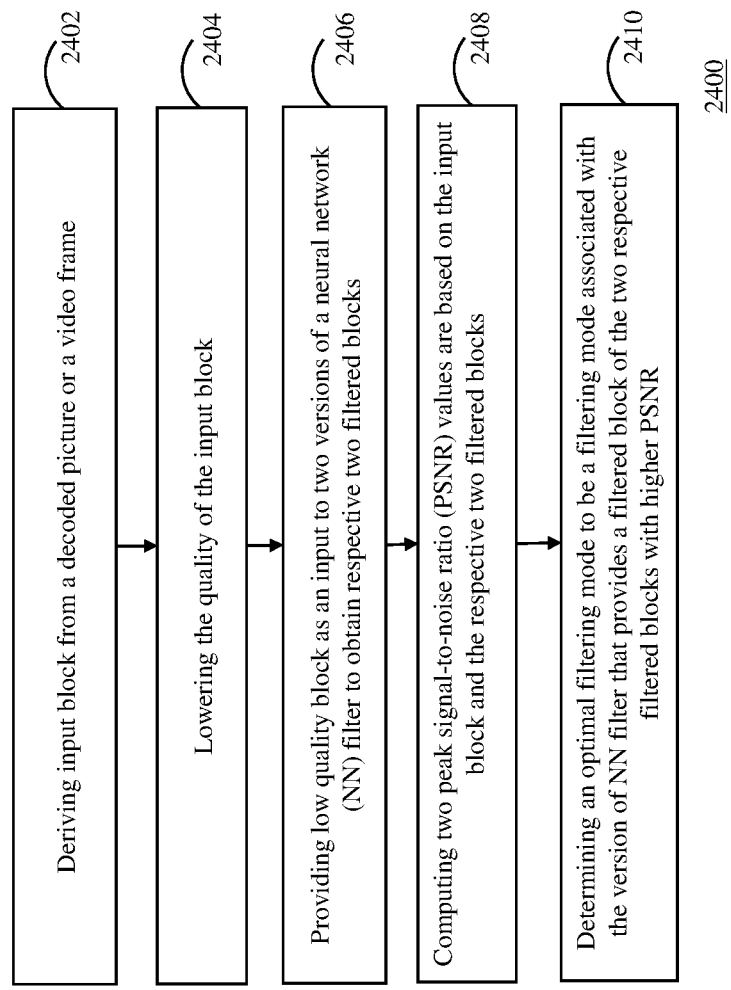
FIG. 24 illustrates an example method for decoder-side selection of filtering modes, in accordance with another embodiment.

FIG. 24 illustrates an example method 2400 for decoder-side selection of filtering modes, in accordance with another embodiment. As shown in block 2106 of FIG. 21, the apparatus 2100 includes means, such as the processing circuitry 2102 or the like, for decoder-side selection of filtering modes. At 2402, the method 2400 includes deriving input block from a decoded picture or a video frame. At 2404, the method 2400 includes lowering the quality of the input block. At 2406, the method 2400 includes providing low quality block as an input to two versions of a neural network (NN) filter to obtain respective two filtered blocks. The two versions are associated with two respective filtering modes, wherein a first version of the two versions is a pretrained NN filter and a second version of the two versions is an overfitted NN filter. At 2408, the method 2400 includes computing two peak signal-to-noise ratio (PSNR) values are based on the input block and the respective two filtered blocks. At 2410, the method 2400 includes determining an optimal filtering mode to be a filtering mode associated with the version of NN filter that provides a filtered block of the two respective filtered blocks with higher PSNR.

Figure 25:
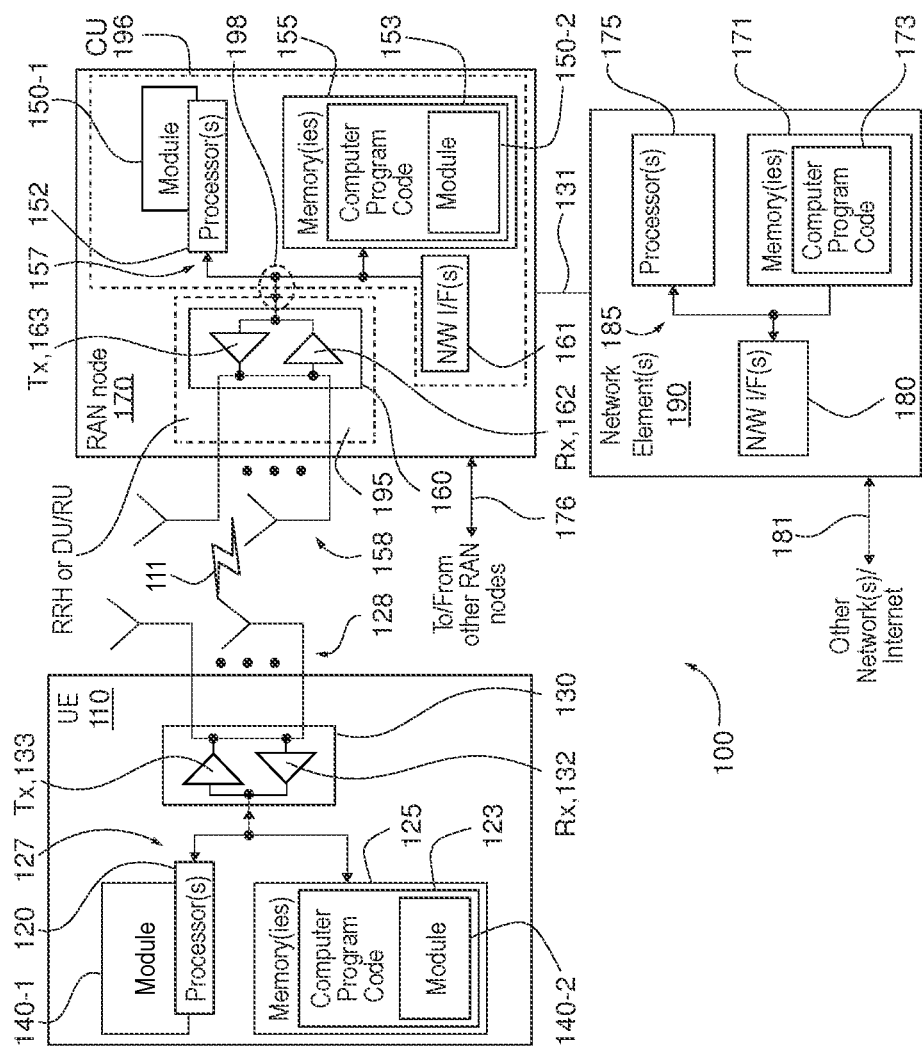
FIG. 25 is a block diagram of one possible and non-limiting system in which the example embodiments may be practiced.

Referring to FIG. 25, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to blend extra output pixels of a filter and/or decoder-side selection of filtering modes. Computer program code 173 may also be configured to blending extra output pixels of a filter.

As described above, FIGS. 22 to 24 include a flowchart of an apparatus (e.g. 50, 100, 602, 604, 700, or 2100), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 704, or 2104) of an apparatus employing an embodiment of the present invention and executed by processing circuitry (e.g. 56, 120, 702, or 2102) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 22 to 24. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with reference to an SEI message or an SEI NAL unit. It needs to be understood, however, that embodiments can be similarly realized with any similar structures or data units. Where example embodiments have been described with SEI messages contained in a structure, any independently parsable structures could likewise be used in embodiments. Specific SEI NAL unit and a SEI message syntax structures have been presented in example embodiments, but it needs to be understood that embodiments generally apply to any syntax structures with a similar intent as SEI NAL units and/or SEI messages.

In the above, some embodiments have been described in relation to a particular type of a parameter set (namely adaptation parameter set). It needs to be understood, however, that embodiments could be realized with any type of parameter set or other syntax structure in the bitstream.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' or ' 'circuit' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' or 'circuit' applies to uses of this term in this application. As a further example, as used herein, the term 'circuitry' would also cover an implementation of merely a processor (or multiple processors) or a portion of a processor and its (or their) accompanying software and/or firmware. The term 'circuitry' or 'circuit' would also cover, for example and if applicable to the particular element, a baseband integrated circuit or applications processor integrated circuit for a mobile phone or a similar integrated circuit in a server, a cellular network device, or another network device.

What is claimed is:

1. An apparatus comprising:
   at least one processor; and
   at least one memory storing instructions that, when executed by the at least one processor, cause the apparatus at least to:
      receive an input extended block, wherein the input extended block comprises an input block and one or more input margins, and wherein the input block is derived from an image or a video frame, and wherein the input block and the one or more input margins are input to a filter, and wherein the one or more input margins comprise one or more pixels of the image or the video frame;
      filter the input extended block to obtain a filtered extended block, wherein the filtered extended block comprises a filtered block and one or more filtered margins;
      receive one or more other blocks, wherein the one or more other blocks are derived from the image or the video frame, and wherein at least one pixel of the one or more other blocks overlaps with at least one pixel of the filtered margins of the filtered extended block; and
      blend the filtered extended block with the one or more other blocks, wherein an operation to blend the filtered extended block with the one or more other blocks is applied to two or more overlapping pixels, and wherein a pixel is considered to overlap with another pixel when a position of the pixel and the another pixel, within the image or the video frame, is same or substantially same.

2. The apparatus of claim 1, wherein:
   the input extended block comprises a first extended block and the one or more other blocks comprise a second extended block, and wherein at least one pixel of the first extended block overlaps with at least one pixel of the second extended block;
   the first extended block is filtered by using a first filter to obtain a first filtered extended block, wherein the first filtered extended block comprises a first filtered block and first one or more filtered margins;
   the apparatus is further caused to filter, by using a second filter, the second extended block to obtain a second filtered extended block, wherein the second filtered extended block comprises a second filtered block and second one or more filtered margins; and
   the two or more overlapping pixels comprise:
      a first set of pixels comprised in the first filtered block and a second set of pixels comprised in a filtered margin of the second one or more filtered margins; or
      a first set of pixels comprised in a filtered margin of the first one or more filtered margins and the second set of pixels comprised in the second filtered block.

3. The apparatus of claim 1, wherein the two or more overlapping pixels are blended by a weighted sum based at least on two or more weights.

4. The apparatus of claim 3, wherein:
   the two or more weights are predetermined;
   the two or more weights are predetermined and change linearly based at least on a position of pixels they are associated with;
   the two or more weights are predetermined and are fixed or do not change according to the position of the pixels they are associated with; or
   the two or more weights are predetermined and at least one of the predetermined weight is determined based at least on a performance of the filter.

5. The apparatus of claim 3, wherein the apparatus is further caused to determine the two or more weights, and wherein the determined two or more weights, or indications of the determined two or more weights are signaled from an encoder to a decoder.

6. The apparatus of claim 3, wherein the apparatus is further caused to determine the two or more weights based on one or more of the following:
   data of the input block;
   data of the input extended block;
   data of a margin of the one or more input margins;
   data of the filtered block;
   data of the filtered extended block;

data of a filtered margin comprised in the filtered extended block; or one or more estimate of uncertainty or confidence of the filter with respect to data of at least the filtered block or the one or more filtered margins.

7. The apparatus of claim 3, wherein the apparatus is further caused to:

determine an optimal mode, to weight the two or more overlapping pixels, from two or more candidate modes; and signal the optimal mode or indication of the optimal mode from an encoder to a decoder.

8. The apparatus of claim 7, wherein the apparatus is further caused to determine the optimal mode based at least on one of the following:

a first set of predetermined weights, wherein the first set of predetermined weights linearly change according to a position of pixels to which they are applied;

a second set of predetermined weights, wherein the second set of predetermined weights linearly change according to a position of pixels to which they are applied;

the first set of predetermined weights, wherein the first set of predetermined weights do no change according to the position of the pixels to which they are applied;

the second set of predetermined weights, wherein the second set of predetermined weights do not change according to the position of the pixels to which they are applied;

a set of weights, wherein the set of weights or indications about the set of weights are signaled from an encoder to the decoder; or a set of content-adaptive weights.

9. A method comprising:

receiving an input extended block, wherein the input extended block comprises an input block and one or more input margins, and wherein the input block is derived from an image or a video frame, and wherein the input block and the one or more input margins are input to a filter, and wherein the one or more input margins comprise one or more pixels of the image or the video frame;

filtering the input extended block to obtain a filtered extended block, wherein the filtered extended block comprises a filtered block and one or more filtered margins;

receiving one or more other blocks, wherein the one or more other blocks are derived from the image or the video frame, and wherein at least one pixel of the one or more other blocks overlaps with at least one pixel of the filtered margins of the filtered extended block; and blending the filtered extended block with the one or more other blocks, wherein an operation to blend the filtered extended block with the one or more other blocks is applied to two or more overlapping pixels, and wherein a pixel is considered to overlap with another pixel when a position of the pixel and the another pixel, within the image or the video frame, is same or substantially same.

10. The method of claim 9, wherein:

the input extended block comprises a first extended block and the one or more other blocks comprise a second extended block, and wherein at least one pixel of the first extended block overlaps with at least one pixel of the second extended block;

the first extended block is filtered by using a first filter to obtain a first filtered extended block, wherein the first filtered extended block comprises a first filtered block and first one or more filtered margins;

the method further comprises filtering, by using a second filter, the second extended block to obtain a second filtered extended block, wherein the second filtered extended block comprises a second filtered block and second one or more filtered margins; and the two or more overlapping pixels comprise:

a first set of pixels comprised in the first filtered block and a second set of pixels comprised in a filtered margin of the second one or more filtered margins; or a first set of pixels comprised in a filtered margin of the first one or more filtered margins and the second set of pixels comprised in the second filtered block.

11. The method of claim 9, wherein the two or more overlapping pixels are blended by a weighted sum based at least on two or more weights.

12. The method of claim 11, wherein:

the two or more weights are predetermined;

the two or more weights are predetermined and change linearly based at least on a position of pixels they are associated with;

the two or more weights are predetermined and are fixed or do not change according to the position of the pixels they are associated with; or the two or more weights are predetermined and at least one of the predetermined weight is determined based at least on a performance of the filter.

13. The method of claim 11 further comprising determining the two or more weights, and wherein the determined two or more weights, or indications of the determined two or more weights are signaled from an encoder to a decoder.

14. The method of claim 11 further comprising determining the two or more weights based on one or more of the following:

data of the input block;

data of the input extended block;

data of a margin of the one or more input margins;

data of the filtered block;

data of the filtered extended block;

data of a filtered margin comprised in the filtered extended block; or one or more estimate of uncertainty or confidence of the filter with respect to data of at least the filtered block or the one or more filtered margins.

15. The method of claim 11 further comprising:

determining an optimal mode, to weight the two or more overlapping pixels, from two or more candidate modes; and signaling the optimal mode or indication of the optimal mode from an encoder to a decoder.

16. The method of claim 15 further comprising determining the optimal mode based at least on one of the following:

a first set of predetermined weights, wherein the first set of predetermined weights linearly change according to a position of pixels to which they are applied;

a second set of predetermined weights, wherein the second set of predetermined weights linearly change according to a position of pixels to which they are applied;

the first set of predetermined weights, wherein the first set of predetermined weights do no change according to the position of the pixels to which they are applied;

the second set of predetermined weights, wherein the second set of predetermined weights do no change according to the position of the pixels to which they are applied;

a set of weights, wherein the set of weights or indications about the set of weights are signaled from an encoder to the decoder; or a set of content-adaptive weights.

17. A non-transitory computer readable medium comprising program instructions that, when executed by an apparatus, cause the apparatus to perform at least the following:

receiving an input extended block, wherein the input extended block comprises an input block and one or more input margins, and wherein the input block is derived from an image or a video frame, and wherein the input block and the one or more input margins are input to a filter, and wherein the one or more input margins comprise one or more pixels of the image or the video frame;

filtering the input extended block to obtain a filtered extended block, wherein the filtered extended block comprises a filtered block and one or more filtered margins;

receiving one or more other blocks, wherein the one or more other blocks are derived from the image or the video frame, and wherein at least one pixel of the one or more other blocks overlaps with at least one pixel of the filtered margins of the filtered extended block; and blending the filtered extended block with the one or more other blocks, wherein an operation to blend the filtered extended block with the one or more other blocks is applied to two or more overlapping pixels, and wherein a pixel is considered to overlap with another pixel when a position of the pixel and the another pixel, within the image or the video frame, is same or substantially same.

18. The non-transitory computer readable medium of claim 17, wherein:

the input extended block comprises a first extended block and the one or more other blocks comprise a second extended block, and wherein at least one pixel of the first extended block overlaps with at least one pixel of the second extended block;

the first extended block is filtered by using a first filter to obtain a first filtered extended block, wherein the first filtered extended block comprises a first filtered block and first one or more filtered margins;

wherein the apparatus is further caused to perform filtering, by using a second filter, the second extended block to obtain a second filtered extended block, wherein the second filtered extended block comprises a second filtered block and second one or more filtered margins; and the two or more overlapping pixels comprise:

a first set of pixels comprised in the first filtered block and a second set of pixels comprised in a filtered margin of the second one or more filtered margins; or a first set of pixels comprised in a filtered margin of the first one or more filtered margins and the second set of pixels comprised in the second filtered block.

19. The non-transitory computer readable medium of claim 17, wherein the two or more overlapping pixels are blended by a weighted sum based at least on two or more weights.

20. The non-transitory computer readable medium of claim 19, wherein:

the two or more weights are predetermined;

the two or more weights are predetermined and change linearly based at least on a position of pixels they are associated with;

the two or more weights are predetermined and are fixed or do not change according to the position of the pixels they are associated with; or the two or more weights are predetermined and at least one of the predetermined weight is determined based at least on a performance of the filter.

* * * * *